US010461908B2

(12) United States Patent
Patel et al.

(10) Patent No.: US 10,461,908 B2
(45) Date of Patent: Oct. 29, 2019

(54) TECHNIQUES FOR PROVIDING CHANNELS IN LOW LATENCY LTE WIRELESS COMMUNICATIONS

(71) Applicant: QUALCOMM Incorporated, San Diego, CA (US)

(72) Inventors: Shimman Arvind Patel, San Diego, CA (US); Wanshi Chen, San Diego, CA (US); Peter Gaal, San Diego, CA (US); Hao Xu, San Diego, CA (US); Juan Montojo, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 15/194,278

(22) Filed: Jun. 27, 2016

(65) Prior Publication Data

US 2017/0134236 A1     May 11, 2017

Related U.S. Application Data

(60) Provisional application No. 62/254,056, filed on Nov. 11, 2015.

(51) Int. Cl.
*H04L 5/00* (2006.01)
*H04W 72/04* (2009.01)
(Continued)

(52) U.S. Cl.
CPC ........ *H04L 5/0051* (2013.01); *H04B 7/0626* (2013.01); *H04L 5/0044* (2013.01);
(Continued)

(58) Field of Classification Search
CPC ..... H04L 5/0044–0055; H04W 72/1278–1294
See application file for complete search history.

(56) References Cited

U.S. PATENT DOCUMENTS

| 2014/0219255 A1* | 8/2014 | Eyuboglu | H04W 72/12 370/336 |
| 2015/0296533 A1 | 10/2015 | Park | |

(Continued)

OTHER PUBLICATIONS

International Search Report and Written Opinion—PCT/US2016/048480—ISA/EPO—Nov. 22, 2016. (14 total pages).

(Continued)

*Primary Examiner* — Marcus Smith
(74) *Attorney, Agent, or Firm* — Anthony R. Morris

(57) ABSTRACT

Various aspects described herein relate to communicating using a configurable bandwidth. A user equipment (UE) can receive a control channel from a serving evolved Node B (eNB), where the control channel includes a resource grant for an uplink shared data channel including a number of resource block groups starting from a starting resource block group in an allocation space, and where the allocation space includes a plurality of resource block groups in a frequency domain over a plurality of symbols in a time domain. The UE can transmit data in the uplink shared data channel starting from the starting resource block group in the allocation space and continuing through the number of resource block groups in the allocation space over the frequency domain first and over the time domain second.

30 Claims, 14 Drawing Sheets

(51) Int. Cl.
*H04W 72/12* (2009.01)
*H04L 12/24* (2006.01)
*H04W 74/00* (2009.01)
*H04B 7/06* (2006.01)
*H04L 5/14* (2006.01)

(52) U.S. Cl.
CPC .......... *H04L 5/0055* (2013.01); *H04L 5/1469* (2013.01); *H04L 41/0896* (2013.01); *H04W 72/0446* (2013.01); *H04W 72/0453* (2013.01); *H04W 72/1294* (2013.01); *H04W 74/004* (2013.01)

(56) References Cited

U.S. PATENT DOCUMENTS

| | | | | |
|---|---|---|---|---|
| 2015/0312008 | A1* | 10/2015 | Annavajjala | H04L 1/206 370/252 |
| 2016/0323011 | A1* | 11/2016 | Tang | H04B 1/713 |
| 2017/0111923 | A1* | 4/2017 | Nogami | H04W 72/1263 |
| 2017/0223725 | A1* | 8/2017 | Xiong | H04W 72/1205 |
| 2017/0251466 | A1* | 8/2017 | Astely | H04W 72/0446 |
| 2017/0272322 | A1* | 9/2017 | You | H04L 41/0853 |
| 2017/0317808 | A1* | 11/2017 | You | H04L 5/0055 |
| 2018/0041957 | A1* | 2/2018 | Xiong | H04W 72/1268 |
| 2018/0115984 | A1* | 4/2018 | Sahlin | H04W 72/1268 |

OTHER PUBLICATIONS

Qualcomm Incorporated: "On Physical Layer Aspects of Low Latency Operation", 3GPP Draft; R1-157082, On Physical Layer Aspects of Low Latency Operation, 3rd Generation Partnership Project (3GPP), Mobile Competence Centre; 650, Route Des Lucioles; F-06921 Sophia-Antipolis Cedex; vol. RAN WG1, No. Anaheim, California, USA; Nov. 16, 2015-Nov. 20, 2016, Nov. 7, 2015 (Nov. 7, 2015), pp. 1-4, XP051022666, Retrieved from the Internet: URL:http://www.3gpp.org/ftp/tsg_ran/WG1_RL1/TSGR1_83/Docs/ [retrieved on Nov. 7, 2015].
Toni L., et al., "Dense Small-Cell Networks: Rethinking the Radio Interface Beyond LTE-Advanced", 1st International Conference on 5G for Ubiquitous Connectivity, ICST, Nov. 26, 2014 (Nov. 26, 2014), pp. 163-169, XP032735039, DOI: 10.4108/ICST.5GU.2014.258115 [retrieved on Feb. 11, 2015].
Toni L., et al., "Radio Interface Evolution Towards 5G and Enhanced Local Area Communications", IEEE Access, vol. 2, Sep. 17, 2014 (Sep. 17, 2014), pp. 1005-1029, XP011559830, DOI: 10.1109/Access.2014.2355415 [retrieved on Sep. 22, 2014].

* cited by examiner

TECHNIQUES FOR PROVIDING CHANNELS IN LOW LATENCY LTE WIRELESS COMMUNICATIONS

CLAIM OF PRIORITY UNDER 35 U.S.C. § 119

The present Application for Patent claims priority to Provisional Application No. 62/254,056 entitled "TECHNIQUES FOR PROVIDING CHANNELS IN LOW LATENCY LTE WIRELESS COMMUNICATIONS" filed Nov. 11, 2015, which is assigned to the assignee hereof and hereby expressly incorporated by reference herein for all purposes.

BACKGROUND

Described herein are aspects generally related to communication systems, and more particularly, to providing wireless communication channels.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, further improvements in LTE technology may be desired. Preferably, these improvements should be applicable to other multi-access technologies and the telecommunication standards that employ these technologies.

In wireless communication systems employing legacy LTE, a plurality of UEs served by a particular eNodeB may be scheduled with resources for communicating with the eNodeB over one or more channels using transmission time intervals (TTI) on the order of a 1 millisecond subframe. As UE capabilities and demand for bandwidth increases, lower latency in communications may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for communicating using a configurable bandwidth is provided. The method includes receiving, at a user equipment (UE), a control channel from a serving evolved Node B (eNB), wherein the control channel includes a resource grant indicating a bandwidth and a start indicator for an uplink shared data channel, and transmitting, by the UE, data in the uplink shared data channel over the bandwidth and during a duration from the start indicator to an end of a corresponding subframe.

In another example, an apparatus for communicating using a configurable bandwidth is provided. The apparatus includes a transceiver, a memory, and at least one processor communicatively coupled with the transceiver and the memory. The at least one processor is configured to receive a control channel from a serving evolved Node B (eNB), wherein the control channel includes a resource grant indicating a bandwidth and a start indicator for an uplink shared data channel, and transmit data in the uplink shared data channel over the bandwidth and during a duration from the start indicator to an end of a corresponding subframe.

In another example, an apparatus for communicating using a configurable bandwidth is provided. The apparatus includes means for receiving a control channel from a serving evolved Node B (eNB), wherein the control channel includes a resource grant indicating a bandwidth and a start indicator for an uplink shared data channel, and means for transmitting data in the uplink shared data channel over the bandwidth and during a duration from the start indicator to an end of a corresponding subframe.

In a further example, computer-readable medium storing computer executable code for communicating using a configurable bandwidth is provided. The code includes code for receiving a control channel from a serving evolved Node B (eNB), wherein the control channel includes a resource grant indicating a bandwidth and a start indicator for an uplink shared data channel, and code for transmitting data in the uplink shared data channel over the bandwidth and during a duration from the start indicator to an end of a corresponding subframe.

In other aspects, a method for communicating using a configurable bandwidth is provided. The method includes receiving, at a UE, a control channel from a serving eNB, wherein the control channel includes a resource grant for an uplink shared data channel including a number of resource block groups starting from a starting resource block group in an allocation space, wherein the allocation space includes a plurality of resource block groups in a frequency domain over a plurality of symbols in a time domain, and transmitting, by the UE, data in the uplink shared data channel starting from the starting resource block group in the allocation space and continuing through the number of resource block groups in the allocation space over the frequency domain first and over the time domain second.

In another example, an apparatus for communicating using a configurable bandwidth is provided. The apparatus includes a transceiver, a memory, and at least one processor communicatively coupled with the transceiver and the memory. The at least one processor is configured to receive a control channel from a serving eNB, wherein the control channel includes a resource grant for an uplink shared data channel including a number of resource block groups starting from a starting resource block group in an allocation space, wherein the allocation space includes a plurality of resource block groups in a frequency domain over a plurality of symbols in a time domain, and transmit data in the uplink shared data channel starting from the starting resource block group in the allocation space and continuing through the number of resource block groups in the allocation space over the frequency domain first and over the time domain second.

In another example, an apparatus for communicating using a configurable bandwidth is provided. The apparatus includes means for receiving a control channel from a serving eNB, wherein the control channel includes a resource grant for an uplink shared data channel including a number of resource block groups starting from a starting resource block group in an allocation space, wherein the allocation space includes a plurality of resource block groups in a frequency domain over a plurality of symbols in a time domain, and means for transmitting data in the uplink shared data channel starting from the starting resource block group in the allocation space and continuing through the number of resource block groups in the allocation space over the frequency domain first and over the time domain second.

In a further example, computer-readable medium storing computer executable code for communicating using a configurable bandwidth is provided. The code includes code for receiving a control channel from a serving eNB, wherein the control channel includes a resource grant for an uplink shared data channel including a number of resource block groups starting from a starting resource block group in an allocation space, wherein the allocation space includes a plurality of resource block groups in a frequency domain over a plurality of symbols in a time domain, and code for transmitting data in the uplink shared data channel starting from the starting resource block group in the allocation space and continuing through the number of resource block groups in the allocation space over the frequency domain first and over the time domain second.

In another example, a method for communicating using a configurable bandwidth is provided. The method includes receiving, at a UE, a control channel from a serving eNB, wherein the control channel includes a resource grant indicating a bandwidth and a start indicator for an uplink control channel, and transmitting, by the UE, control data in the uplink control channel over the bandwidth and during a duration from the start indicator to an end of a corresponding subframe.

In another example, an apparatus for communicating using a configurable bandwidth is provided. The apparatus includes a transceiver, a memory, and at least one processor communicatively coupled with the transceiver and the memory. The at least one processor is configured to receive a control channel from a serving eNB, wherein the control channel includes a resource grant indicating a bandwidth and a start indicator for an uplink control channel, and transmit control data in the uplink control channel over the bandwidth and during a duration from the start indicator to an end of a corresponding subframe.

In a further example, an apparatus for communicating using a configurable bandwidth is provided. The apparatus includes means for receiving a control channel from a serving eNB, wherein the control channel includes a resource grant indicating a bandwidth and a start indicator for an uplink control channel, and means for transmitting control data in the uplink control channel over the bandwidth and during a duration from the start indicator to an end of a corresponding subframe.

In another example, computer-readable medium storing computer executable code for communicating using a configurable bandwidth is provided. The code includes code for receiving a control channel from a serving eNB, wherein the control channel includes a resource grant indicating a bandwidth and a start indicator for an uplink control channel, and code for transmitting control data in the uplink control channel over the bandwidth and during a duration from the start indicator to an end of a corresponding subframe.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
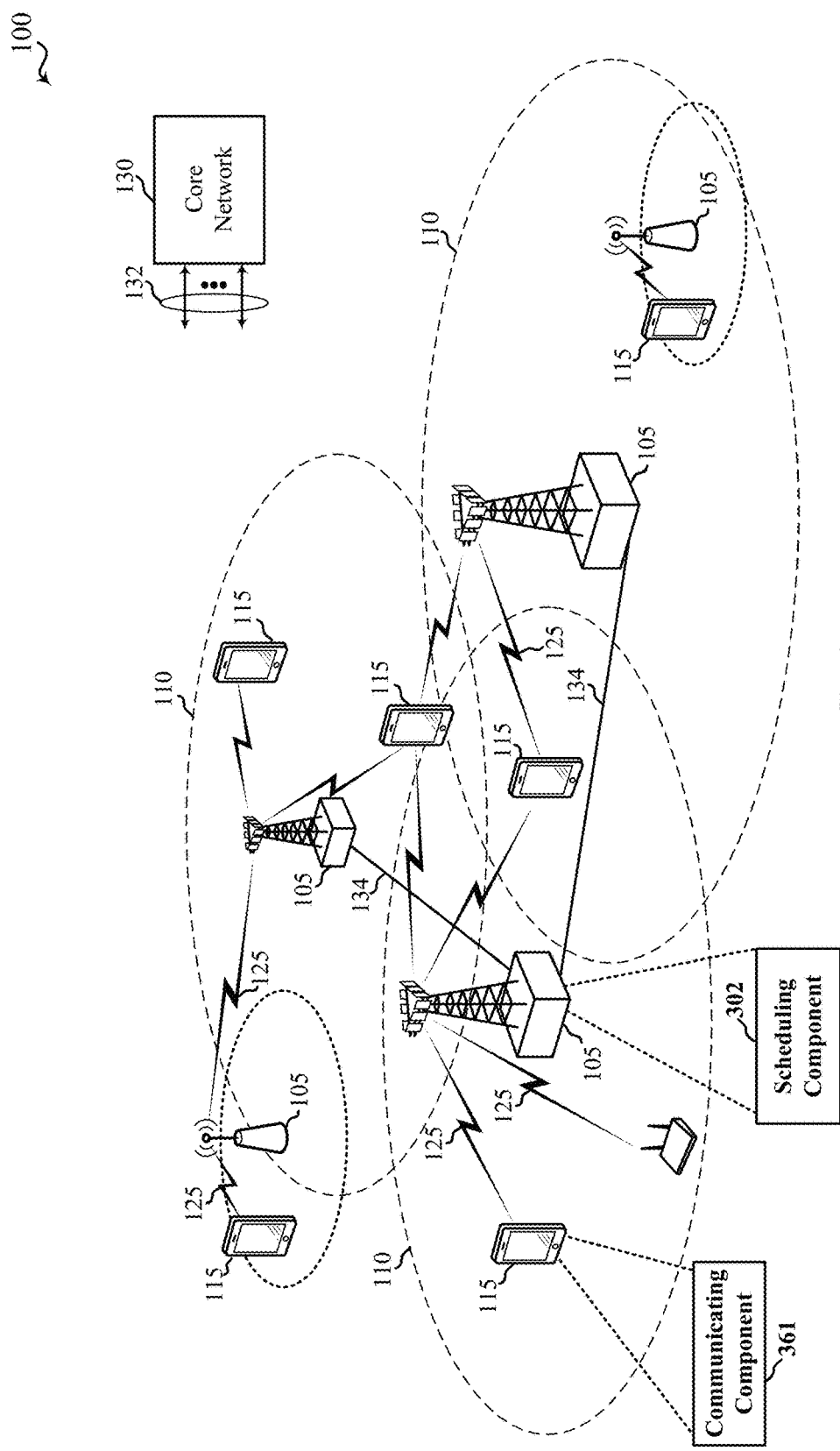
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to providing communication channels in an ultra low latency (ULL) communication technology. For example, a ULL communication technology may be based on a legacy wireless communication technology, such as third generation partnership project (3GPP) long term evolution (LTE), but may utilize different length transmission time intervals (TTI) (e.g., the ULL communication technology may have a shorter TTI duration than the legacy communication technology). For example, a legacy LTE technology may utilize a TTI having a duration of a subframe defined in LTE (e.g., 1 millisecond), where an ultra low latency (ULL) LTE technology can be based on a TTI having a duration less than a subframe (e.g., one symbol, two symbols, a subframe slot, etc.). In this regard, a lower latency in communications is achieved by the shorter, more frequent TTI. Various communication channels can be provided for ULL communication technologies, including a ULL physical uplink control channel (uPUCCH) for communicating control data over an uplink (e.g., from a user equipment (UE) to an evolved Node B (eNB) or other network node), a ULL physical uplink shared channel (uPUSCH) for communicating traffic data over the uplink (where an allocation space for the uPUSCH may include resources for multiple UEs and is accordingly "shared"), etc. In an example, an eNB can allocate and assign resources over an allocation space to one or more UEs to facilitate communications over the ULL uplink channels.

For example, the ULL uplink channels can be provided in a frequency division multiplexing (FDM)/frequency division duplexing (FDD) configuration and/or a time division multiplexing (TDM)/time division duplexing (TDD) configuration. It is to be appreciated that where FDD and TDD are referred to herein, the functions described herein can be similarly applied to FDM and TDM, and vice versa. In an example, in FDM, a portion of frequency resources (e.g., resource blocks) in an allocation space can be divided in time and may include downlink communications, which may be followed by a guard period (where no resources are allocated), followed by allocations for uplink communications to the end of a subframe, and may vary for a given UE in frequency. An allocation space can refer to a portion of frequency over a portion of time (e.g., a system bandwidth, such as 20 megahertz (MHz) in LTE and/or one or more corresponding resource blocks over one or more orthogonal frequency division multiplexing (OFDM) or single carrier (SC)-FDM symbols, such as a subframe in LTE). Thus, the allocations can be dynamic such that in FDM, a start indicator can be included in a resource grant to indicate a beginning portion of time (e.g., a symbol) for uPUSCH. In another example, in TDM, each portion of time (e.g., a symbol) in the allocation space can be divided in frequency such that resources are sequentially assigned in frequency first and in time second. In one example, a plurality of consecutive symbols including a first symbol in a subframe can be allocated for downlink communications, which may be followed by one or more symbols of a guard period, followed by uPUSCH allocation (e.g., to the end of the subframe). In this example, a start indicator and an end indicator for the uPUSCH allocation can be included in the resource grant, where the start indicator specifies a resource block (e.g., a portion of frequency in a period of time) where the uPUSCH allocation for the UE begins, and the end indicator specifies a last resource block of the uPUSCH allocation.

In addition, for example, a portion of frequency in an allocation space can be divided in time to include downlink communications, which may be followed by a guard period, followed by one or more periods of time to the end of a subframe where at least a portion of the one or more periods of time can include a uPUCCH allocation over a portion of the frequency. For example, the portion of the frequency can include a first portion and a last portion of the frequency (e.g., a first portion of a first resource block in frequency and a last portion of a last resource block in the frequency) over the portion of the one or more periods of time (e.g., a portion of one or more OFDM or SC-FDM symbols). In this example, the uPUCCH resource grant can include a start indicator identifying the period of time over which the uPUCCH allocation begins and/or an indicator of one or more frequency resources for the uPUCCH allocation. In an example, the portion of the one or more periods of time can also be used for uPUSCH allocations in the portions of frequency that are not allocated for uPUCCH. Moreover, for example, the uPUCCH allocation may include multiple uPUCCH resources in the allocation space separated in time, the first of which may be referred to as an early bandwidth (as it occurs in time before the second bandwidth of uPUCCH resources in the allocation space), and may include more time sensitive control data, such as hybrid automatic repeat/request (HARQ) feedback.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a scheduling component 302 configured to allocate resources for communicating with UEs 115 over one or more channels using a ULL communication technology. Similarly, one or more of UEs 115 may include a communicating component 361 configured to communicate with one or more access points 105 over one or more channels using the ULL communication technology (e.g., ULL LTE). Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples, a hybrid UE 115-a may communicate with access point 105-a on both a first hierarchical layer that supports first layer transmissions using a first TTI (which may relate to a "legacy communication technology") and a second hierarchical layer that supports second layer transmissions using a second TTI, which may be shorter than the first TTI (which may relate to a "ULL communication technology").

In other examples, a second layer UE 115-b may communicate with access point 105-b on the second hierarchical layer only. Thus, hybrid UE 115-a and second layer UE 115-b may belong to a second class of UEs 115 that may communicate on the second hierarchical layer, while legacy UEs 115 may belong to a first class of UEs 115 that may communicate on the first hierarchical layer only. Access point 105-b and UE 115-b may communicate on the second hierarchical layer through transmissions of subframes of the second subframe type. Access point 105-b may transmit communications related to the first or second hierarchical layer only or may transmit communications for both the first and second hierarchical layers. Where an access point 105-b supports both the first and second hierarchical layers, communicating component 361 can be configured to prioritize communications received from the access point 105-b that relate to the first and second hierarchical layers, as described herein.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In network communication systems using LTE/LTE-A and/or ULL LTE communication technologies, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A small cell may cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via one or more backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-$a$, and/or second layer UE 115-$b$ may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
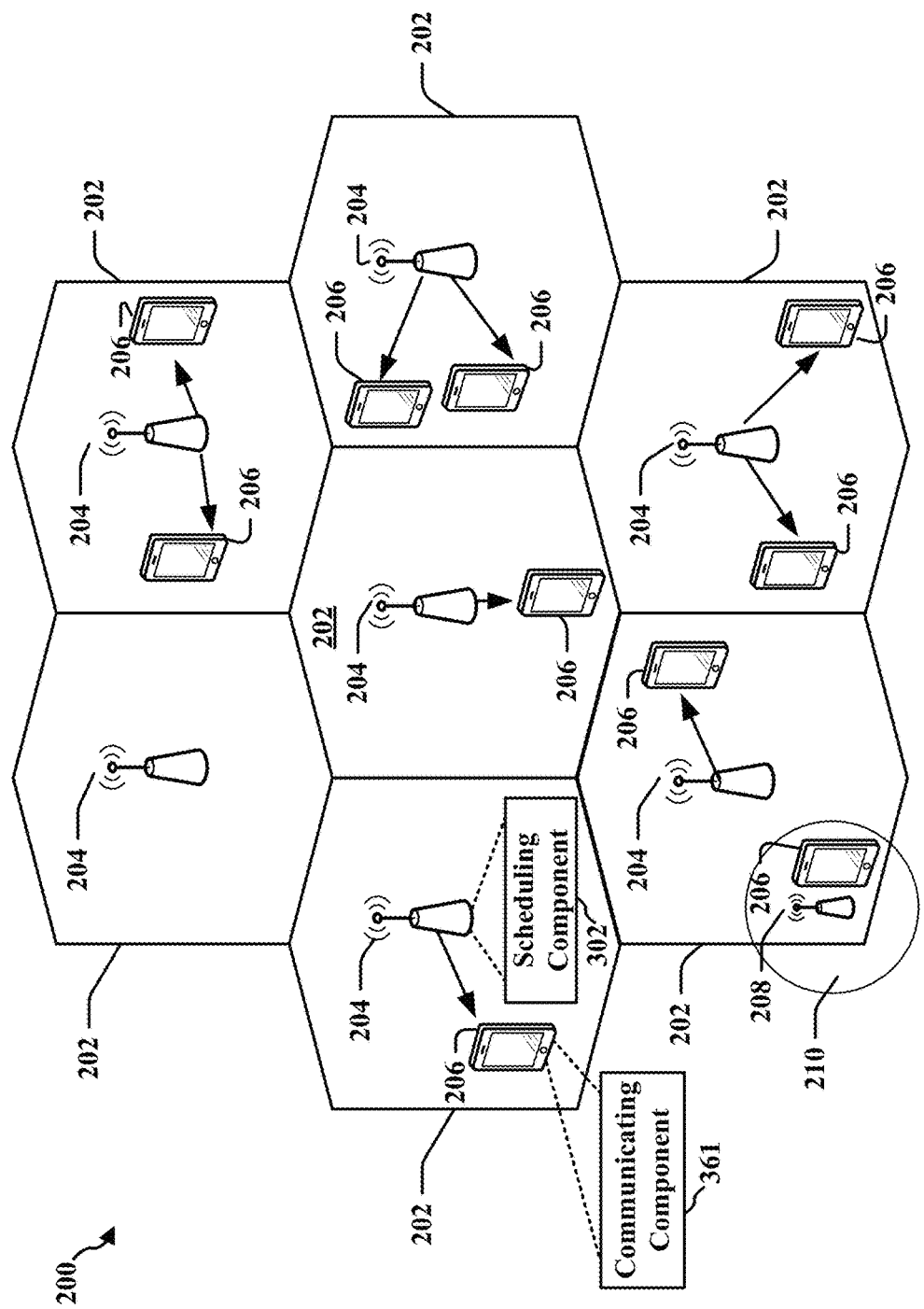
FIG. 2 is a diagram illustrating an example of an access network.

FIG. 2 is a diagram illustrating an example of an access network 200 in an LTE or ULL LTE network architecture. In this example, the access network 200 is divided into a number of cellular regions (cells) 202. One or more small cell eNBs 208 may have cellular regions 210 that overlap with one or more of the cells 202. The small cell eNBs 208 may provide one or more cells of a lower power class, such as a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 and/or 208 may include scheduling component 302 configured to allocate resources for communicating with UEs 206 over one or more channels using a ULL communication technology. Similarly, one or more of UEs 206 may include a communicating component 361 configured to communicate with one or more eNBs 204 and/or 208 over one or more channels using the ULL communication technology (e.g., ULL LTE). There is no centralized controller in this example of an access network 200, but a centralized controller may be used in alternative configurations. The eNBs 204 are responsible for all radio related functions including radio bearer control, admission control, mobility control, scheduling, security, and connectivity to one or more components of core network 130.

The modulation and multiple access scheme employed by the access network 200 may vary depending on the particular telecommunications standard being deployed. In LTE or ULL LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
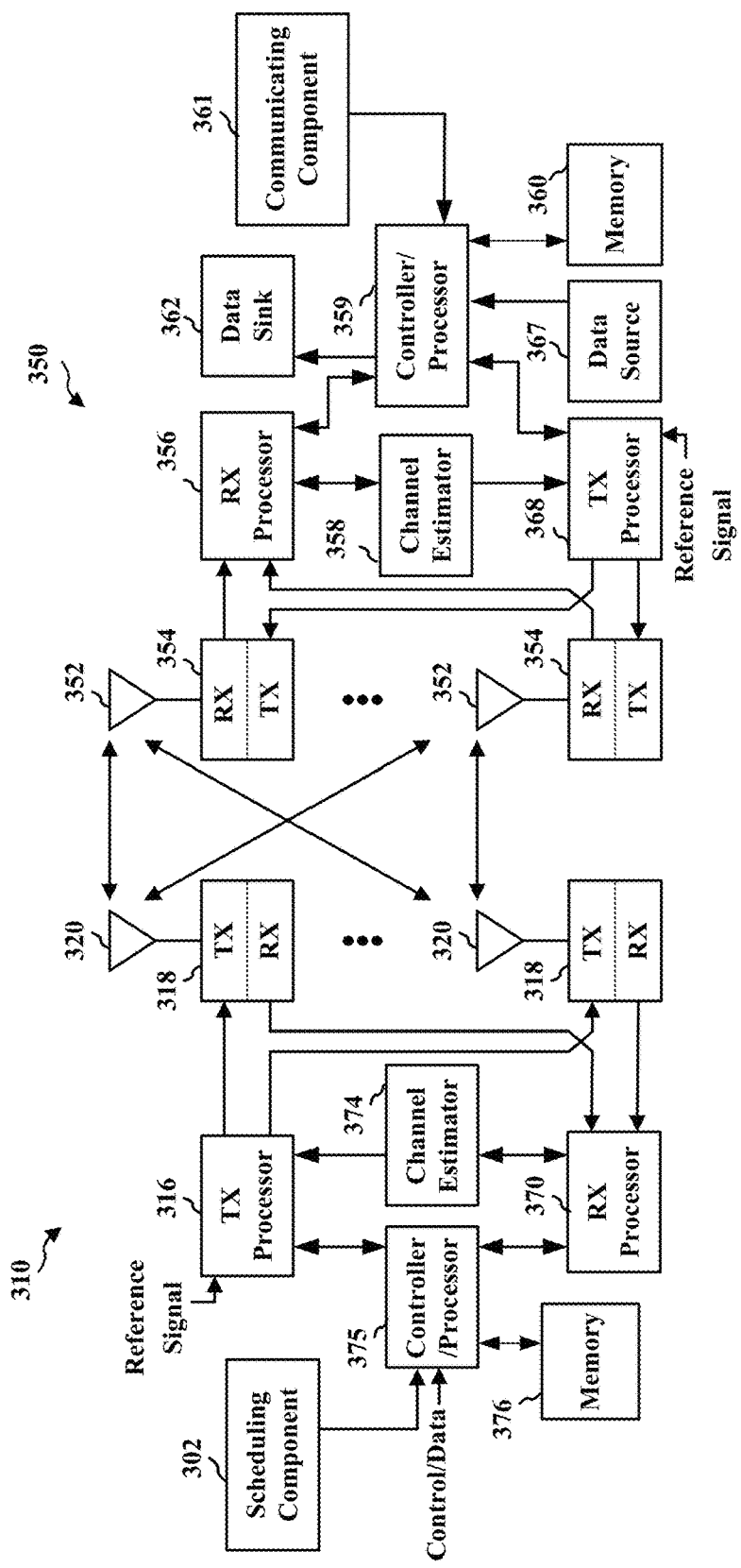
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot signal) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. In addition, eNB 310 may include scheduling component 302 configured to allocate resources for communicating with a UE 350 over one or more channels using a ULL communication technology. For example, though scheduling component 302 is shown as coupled with controller/processor 375, substantially any processor of an eNB 310 can provide the functions of the scheduling component 302 and/or its related components described herein (e.g., in conjunction with controller/processor 375, memory 376, or otherwise). For example, TX processor 316 and/or RX processor 370 can additionally or alternatively provide one or more functions of scheduling component 302, as described herein.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. In addition, communicating component 361 configured to communicate with one or more access points 105 over one or more channels using the ULL communication technology (e.g., ULL LTE). For example, though communicating component 361 is shown as coupled with controller/processor 359, substantially any processor of a UE 350 can provide the functions of the communicating component 361 and/or its related components described herein (e.g., in conjunction with controller/processor 359, memory 360, or otherwise). For example, TX processor 368 and/or RX processor 356 can additionally or alternatively provide one or more functions of communicating component 361, as described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
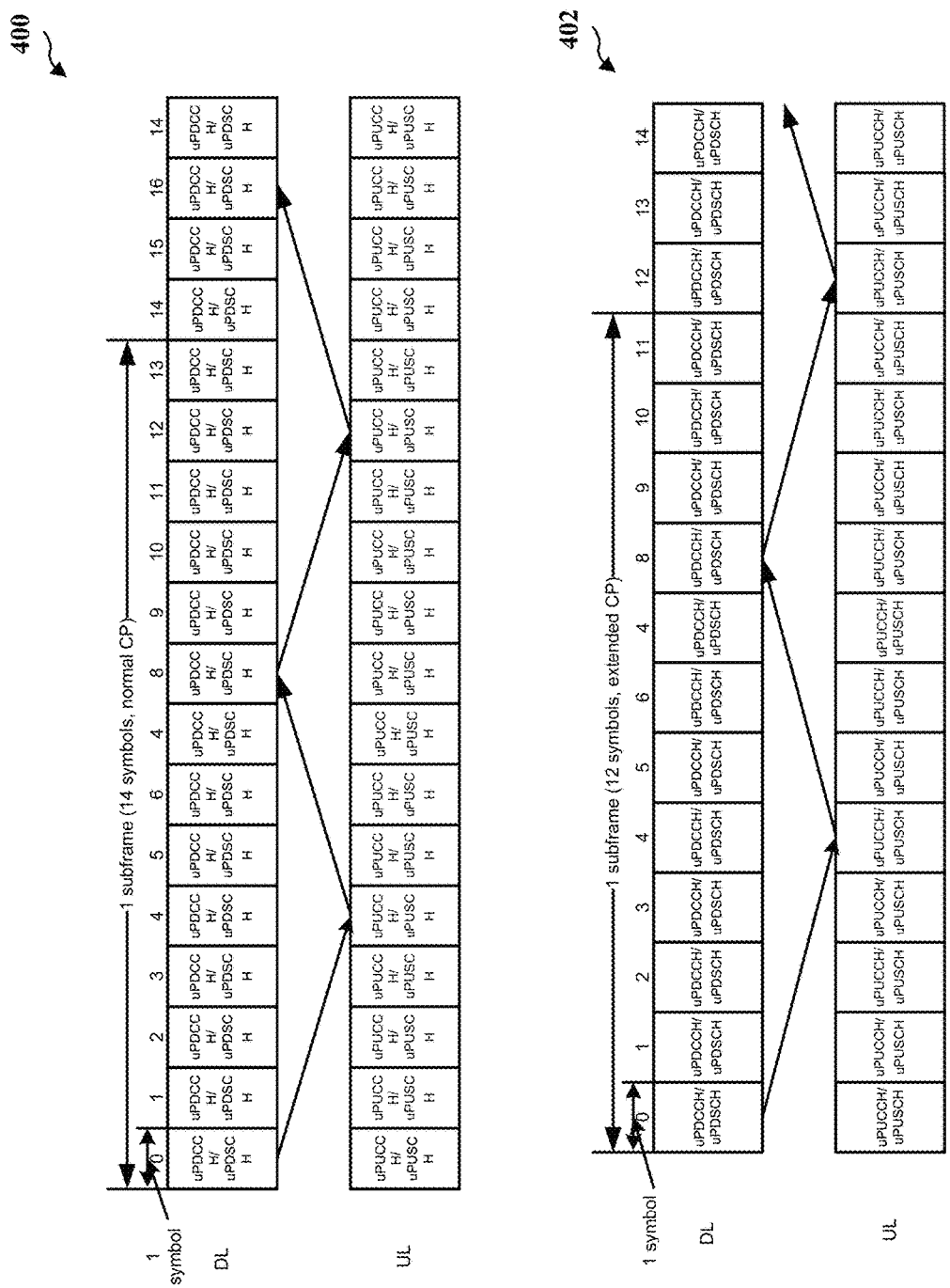
FIG. 4 is a diagram illustrating an example of timelines for ultra low latency (ULL) bandwidth allocation.

FIG. 4 is a diagram illustrating non-limiting examples of a ULL timelines 400, 402, with time progression extending from left to right in the figure, for managing ULL communications in a wireless communication system. In this example, timelines 400, 402 include ULL frames of symbol duration in each symbol of a subframe. Timelines 400, 402 both depict symbols representing a TTI for ULL physical downlink control channel (uPDCCH) and/or ULL physical downlink shared channel (uPDSCH) and symbols representing a TTI including ULL physical uplink control channel (uPUCCH) and/or ULL physical uplink shared channel (uPUSCH). In timelines 400, 14 symbols are shown within a given subframe (e.g., for normal CP), and in timelines 402, 12 symbols are shown within a given subframe (e.g., for extended CP). In either case, lower latency is achieved in ULL by utilizing symbol-based TTIs. In other examples, a TTI may be two or more symbols, a slot of a subframe (where a subframe includes two slots), etc. In addition, HARQ process response time can be 3 symbols (or 4 symbols, 3 dual-symbols, 3 slots, etc.). In the depicted example, uPDCCH/uPDSCH is sent in symbol 0, and HARQ is processed and is sent in symbol 4, etc. in the subframe. Moreover, in accordance with aspects described herein, some symbols within a given subframe can be allocated for downlink communications (e.g., uPDCCH/uPDSCH) while other symbols are allocated for uplink communications (e.g., uPUCCH/uPUSCH).

Figure 5:
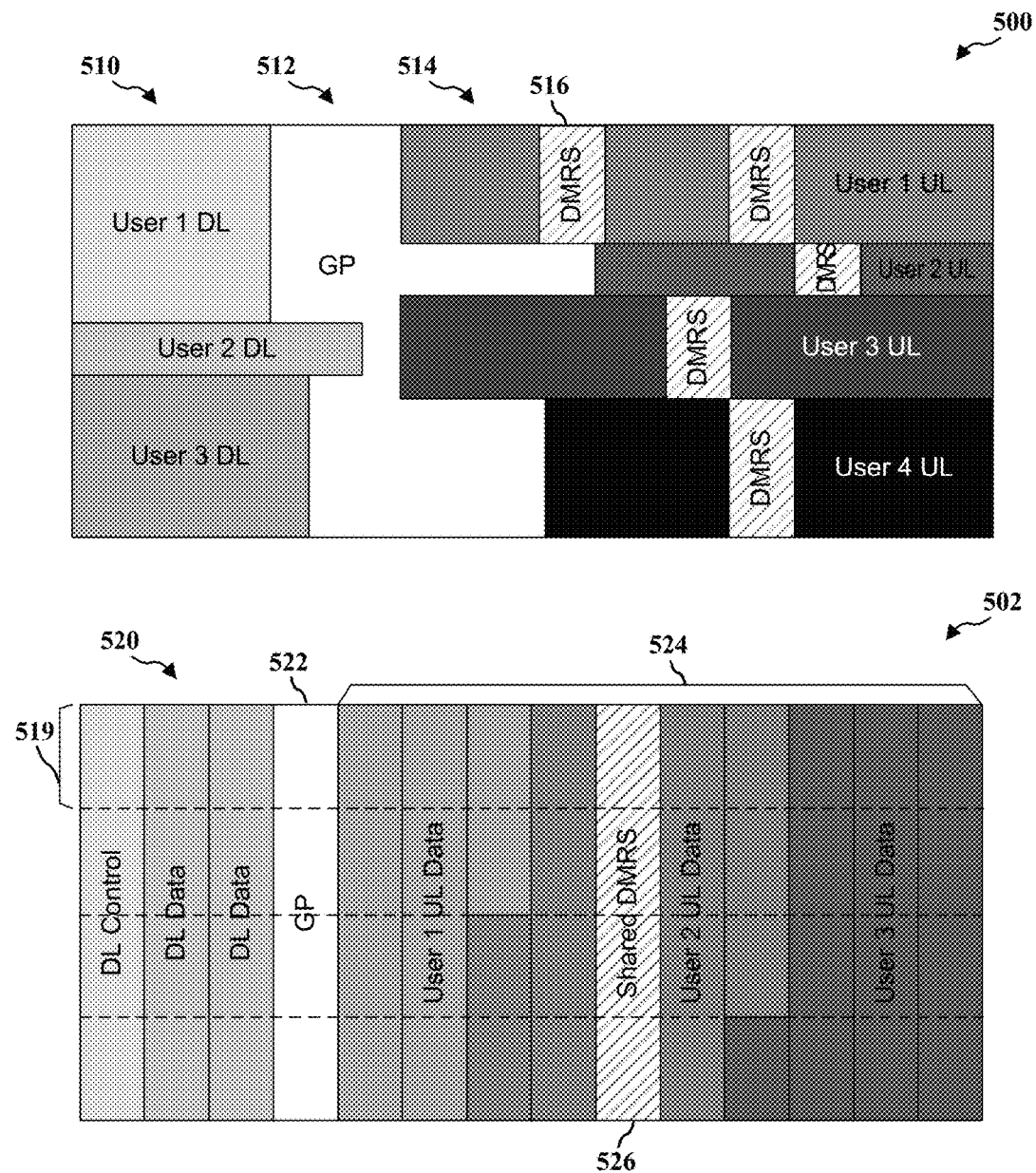
FIG. 5 is a diagram illustrating an example of frequency division multiplexing (FDM) and time division multiplexing (TDM) allocation spaces for uplink channel allocation in accordance with aspects described herein.

FIG. 5 is a diagram illustrating non-limiting examples of resource allocations over allocation spaces 500 and 502 in ULL wireless communications. In allocation space 500, resources are allocated in FDM such that a given portion of frequency (represented vertically) can be allocated to a given UE over a portion of time (represented horizontally). In this example, resources over a given frequency are assigned for downlink channels in first portions of time 510 followed by a guard period (GP) in second portions of time 512 where no resources are allocated, followed by resources over given frequencies assigned for uplink channels in third portions of time 514. As shown, for example, different portions of frequency can be allocated over different portions of time for the downlink channels, GPs, and uplink channels. In an example, the downlink channels can correspond to uPDSCH and the uplink channels can correspond to uPUSCH, for example, and can be allocated from a start indicator indicating the start of the uPUSCH to the end of the subframe, where the start indicator may be specified in the resource allocation or a corresponding resource grant that specifies the resource allocation. In addition, in an example, resources can be allocated for transmitting demodulation reference signals (DM-RS) in one or more periods of time 516 within the resources for the uPUSCH allocation, which can include transmitting the DM-RS in one or more symbols, over multiple non-contiguous symbols, etc., as described herein.

The location of the period of time 516 for transmitting DM-RS may be indicated in the resource allocation (or resource grant) or otherwise determined based on one or more parameters related to the resource allocation, indicated in another configuration, etc., as described further herein. For example, there may be 1 to 2 periods of time 516 for transmitting DM-RS for a given UE in a given subframe, as shown. In another example (though not shown), the location of the periods of time 516, 526 for transmitting DM-RS may be at the beginning of the third periods of time 514, 524. This can allow for lessening the length of the periods of time 512, 522 corresponding to the GP as the DM-RS can take additional time to allow resource grants transmitting the first periods of time 520 to be sufficiently spaced in time (e.g., n symbols, where n can be 4 or substantially any configured value) from the allocated resources in the third periods of time 514, 524.

In allocation space 500, resources are allocated in FDM such that a number of contiguous resource block (RB) groups 519 can be allocated to one or more UEs for ULL communications. Allocation space 502 can include a plurality of RB groups 519 of frequency over one or more periods of time (e.g., a symbol). In one example, in a 20 MHz frequency band, allocation space 502 can be divided into 4 5 MHz portions over a plurality of symbols, where each RB group 519 corresponds to 5 MHz (e.g., which may include 25 RBs) over a symbol. In this example, a first number of periods of time 520 (e.g., symbols) can be allocated for downlink communications, followed by one or more periods of time 522 as a GP, followed by one or more periods of time 524 for allocating uplink communications. In this example, periods of time 524 can be allocated to different UEs, and thus a resource grant may indicate a start indicator and end indicator corresponding to a starting RB group and an ending RB group for the resource allocation, respectively. Moreover, a period of time 526 within periods of time 524 can be allocated for transmitting DM-RS by one or more UEs (e.g., the UE DM-RS transmissions can be multiplexed over frequency in the period of time 526), which may be specified in the resource allocation (or resource grant), or other configuration, as described further herein.

Figure 6:
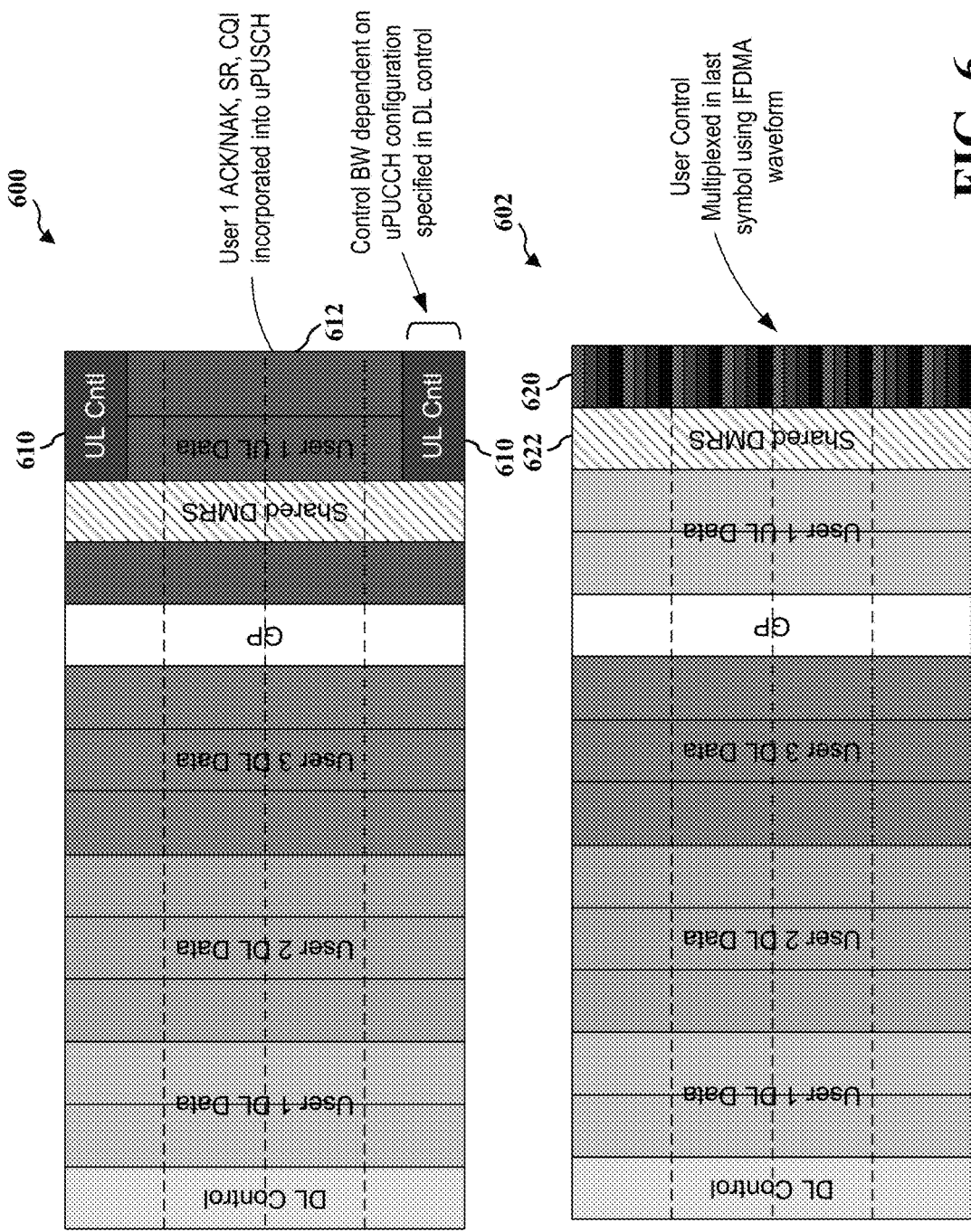
FIG. 6 is a diagram illustrating an example of TDM allocation spaces for uplink shared data channel and uplink control channel resource allocations in accordance with aspects described herein.

FIG. 6 is a diagram illustrating non-limiting examples of resource allocations over allocation spaces 600 and 602 in ULL wireless communications. In allocation space 600, resources are allocated in TDM, as similarly shown and described with respect to allocation space 502 in FIG. 5, including periods of time allocated for downlink communications, periods of time for GP, followed by periods of time for allocating uplink communications (and/or periods of time for DM-RS transmission in the periods of time for allocating uplink communications). Moreover, in this example, a portion of the periods of time for allocating uplink communications (e.g., a portion of symbols, such as the last two symbols) can also include uplink control channel resource allocations in portions of frequency 610 of the portion of the periods of time. In this example, the portions of frequency 610 within the portions of the periods of time for allocating uplink control channels can include first and last frequency portions of the portions of periods of time (e.g., first and last numbers of RBs in a first and last RB group in the portion of symbols). In an example, the first and last portions of frequency 610 can be similar in size (e.g., bandwidth). Moreover, for example, the portions of frequency 610 can correspond to (or otherwise be dependent on) an uplink control channel allocation for the same (or different) UE to which the uPUSCH allocation in the remaining portions of frequency over the portion of the periods of time relate. In an example, one or more UEs can include control data (e.g., ACK/NACK, SR, CQI, etc.) incorporated with uplink data in portions of the periods of time outside of the portions for allocating uplink control channels (e.g., in portion of frequency 612). For example, UEs allocated uplink shared data channel resources in portion of frequency 612 may be aware of the control channel allocations in portions of frequency 610, and may accordingly integrate control data into the uplink shared data channel resources in portion of frequency 612 to preserve SC-FDMA waveform, as described further herein.

In allocation space 602, resources are allocated in TDM, as similarly shown and described with respect to allocation space 502 in FIG. 5 including periods of time allocated for downlink communications, periods of time for GP, followed by periods of time for allocating uplink communications (and/or periods of time for DM-RS transmission in the periods of time for allocating uplink communications). Moreover, in this example, a portion of the periods of time for allocating uplink communications (e.g., a portion of symbols, such as the last symbol) can also include uplink control channel resource allocations in portions of frequency 620 for various UEs, where the corresponding control channel transmissions are multiplexed over the portion of the periods of time (e.g., using an interleaved frequency division multiple access (IFDMA) waveform). In an example, as shown, portions of frequency 620 can use an even spacing (e.g., tone spacing) between RBs allocated to each UE. In one example, allocation space 602, using uplink control channel resource allocations in portions of frequency 620, can also use portions of frequency 622 for a shared DM-RS pilot.

Figure 7:
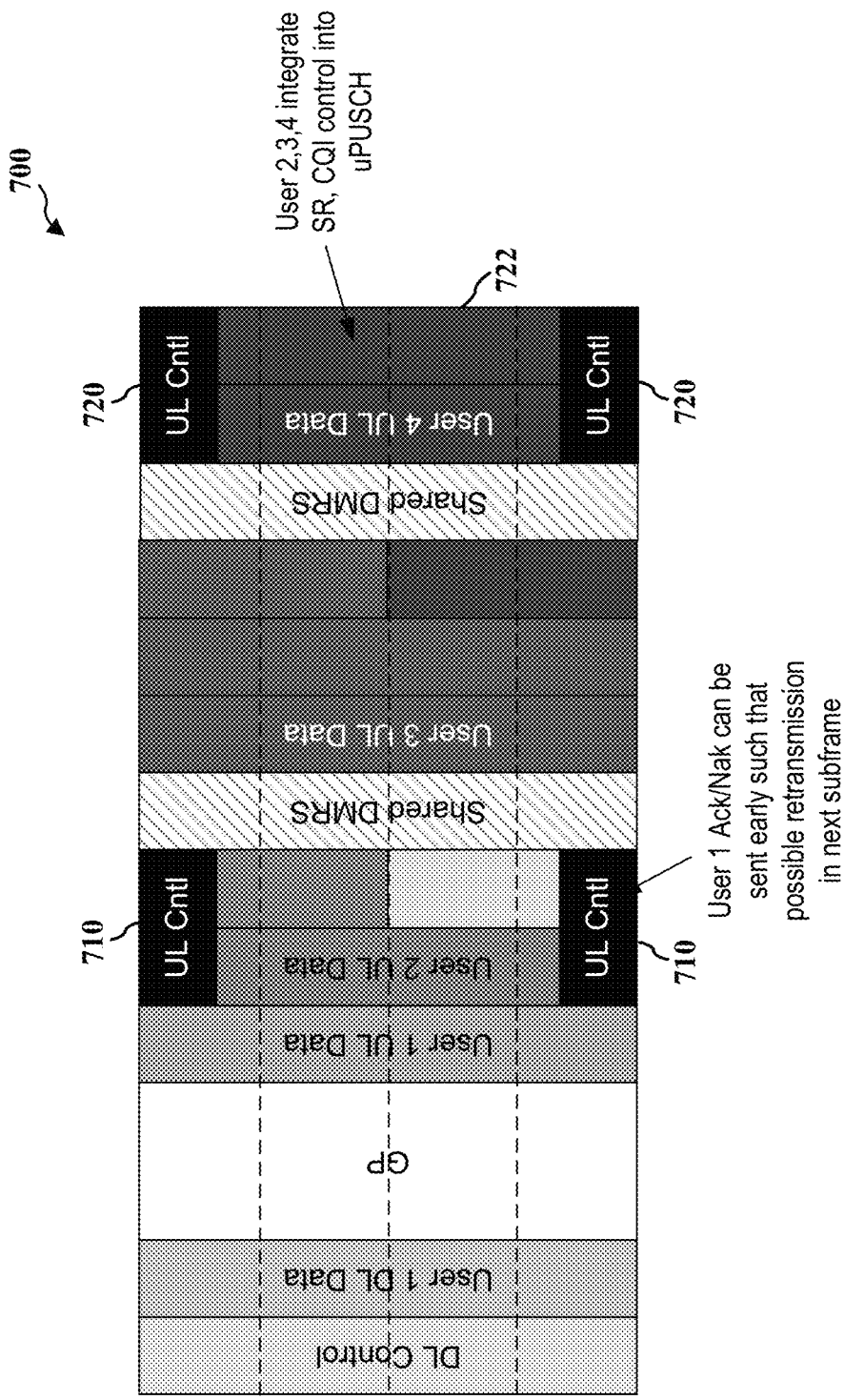
FIG. 7 is a diagram illustrating an example of a TDM allocation space for uplink shared data channel and uplink control channel resource allocations having an early and late bandwidth allocation in accordance with aspects described herein.

FIG. 7 is a diagram illustrating a non-limiting example of resource allocations over allocation space 700 in ULL wireless communications. In allocation space 700, resources are allocated in TDM, as similarly shown and described with respect to allocation space 502 in FIG. 5 including periods of time allocated for downlink communications, periods of time for GP, followed by periods of time for allocating uplink communications (and/or periods of time for DM-RS transmission in the periods of time for allocating uplink communications). Moreover, in this example, a portion of the periods of time for allocating uplink communications (e.g., a portion of symbols, such as the last two symbols) can also include multiple uplink control channel resource allocations in portions of frequency 710 and 720 of the portion of the periods of time. In this example, the portions of frequency 710 and 720 within the portions of the periods of time for allocating uplink control channels can include first and last frequency portions of the portions of periods of time (e.g., first and last numbers of RBs in a first and last RB group in the portion of symbols). In an example, the first and last portions of frequency 710 and 720 can be similar in size (e.g., bandwidth). In some examples, portions of frequency 710 occurring before portions of frequency 720 in time can be referred to herein as "early bandwidth" and may be used to schedule certain time-sensitive control data, such as HARQ feedback, while the other portions of frequency 720 can be used for less time-sensitive control data, such as a scheduling request (SR), channel quality indicator (CQI), etc. In an example, one or more UEs can include control data (e.g., ACK/NACK, SR, CQI, etc.) as incorporated with uplink data in portions of the periods to time outside of the portions for allocating uplink control channels (e.g., in portion 722).

Referring to FIGS. 8-14, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 9-14 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Figure 8:
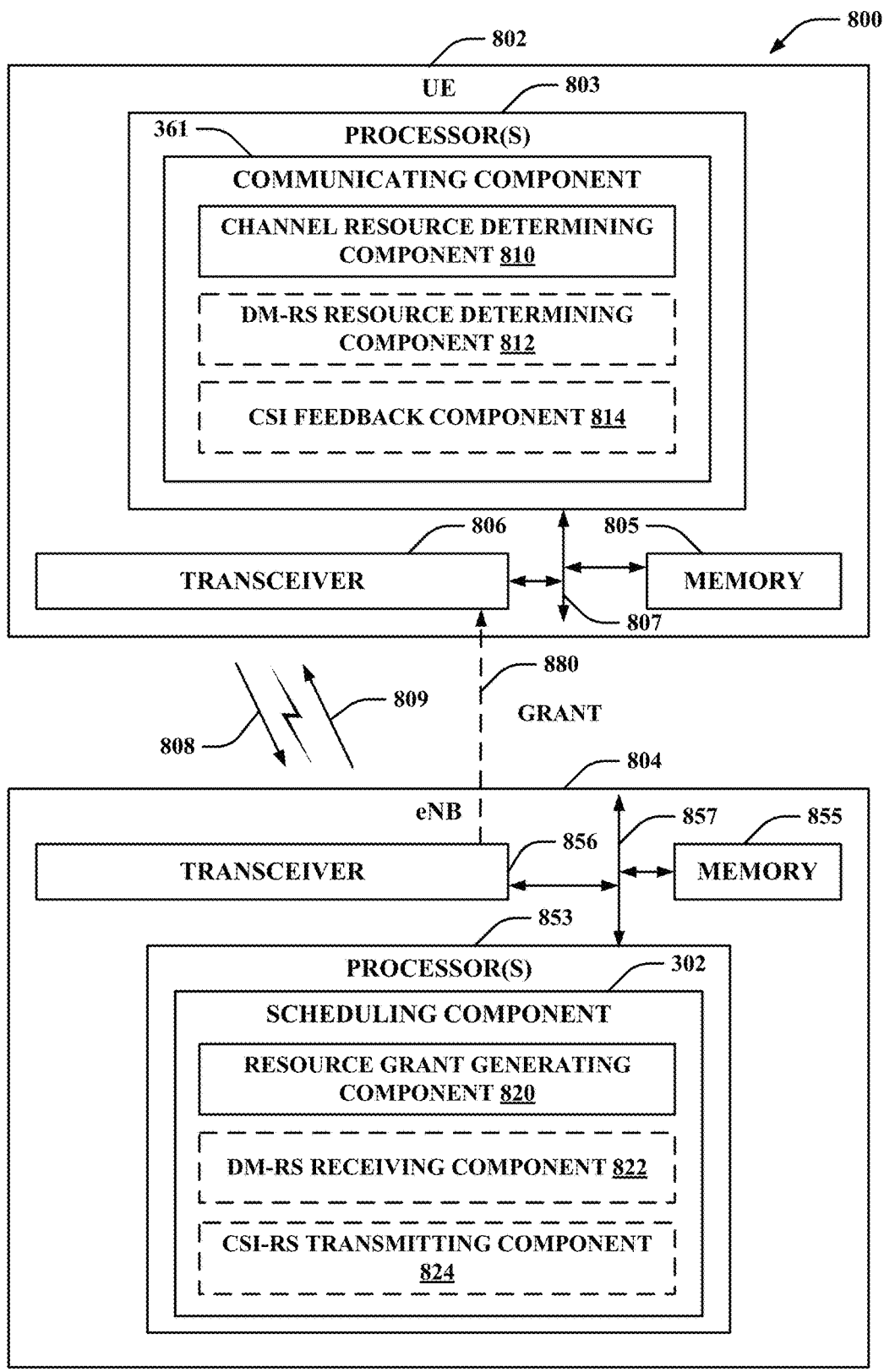
FIG. 8 is a diagram illustrating an example of a system for communicating over channels defined in a ULL wireless communication technology in accordance with aspects described herein.

FIG. 8 illustrates an example system 800 for providing channels in ULL communications. System 800 includes a UE 802 that communicates with an eNB 804 to access a wireless network, examples of which are described in FIGS. 1-3 (e.g., access points 105, eNB 204, small cell eNB 208, eNB 310, UEs 115, 206, 350, etc.), above. In an aspect, eNB 804 and UE 802 may have established one or more downlink channels over which to communicate via downlink signals 809, which can be transmitted by eNB 804 (e.g., via transceiver 856) and received by UE 802 (e.g., via transceiver 806) for communicating control and/or data messages (e.g., in signaling) from the eNB 804 to the UE 802 over configured communication resources. Moreover, for example, eNB 804 and UE 802 may have established one or more uplink channels over which to communicate via uplink signals 808, which can be transmitted by UE 802 (e.g., via transceiver 806) and received by eNB 804 (e.g., via transceiver 856) for communicating control and/or data messages (e.g., in signaling) from the UE 802 to the eNB 804 over configured communication resources. As described further herein, for example, eNB 804 may communicate a resource grant 880 that can indicate resources over which the UE 802 is to communicate (e.g., transmit or receive) data with eNB 804, where the resources can correspond to a legacy and/or ULL communication technology, as described. For example, resources related to a ULL communication technology can relate to a ULL timeline (e.g., a timeline having a TTI that is less than a subframe in duration, such as the timelines 400, 402 in FIG. 4), and/or may correspond to a grant in an allocation space (e.g., as described in reference to the examples of allocation spaces 500, 502, 600, 602, 700, etc. in FIGS. 5-7).

In an aspect, UE 802 may include one or more processors 803 and/or a memory 805 that may be communicatively coupled, e.g., via one or more buses 807, and may operate in conjunction with or otherwise implement a communicating component 361 for communicating using a ULL communication technology based on one or more resource grants. For example, the various operations related to communicating component 361 may be implemented or otherwise executed by one or more processors 803 and, in an aspect, can be executed by a single processor, while in other aspects, different ones of the operations may be executed by a combination of two or more different processors. For example, in an aspect, the one or more processors 803 may include any one or any combination of a modem processor, or a baseband processor, or a digital signal processor, or an application specific integrated circuit (ASIC), or a transmit processor, receive processor, or a transceiver processor associated with transceiver 806. Further, for example, the memory 805 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 803. Moreover, memory 805 or computer-readable storage medium may be resident in the one or more processors 803, external to the one or more processors 803, distributed across multiple entities including the one or more processors 803, etc.

In particular, the one or more processors 803 and/or memory 805 may execute actions or operations defined by communicating component 361 or its subcomponents. For instance, the one or more processors 803 and/or memory 805 may execute actions or operations defined by a channel resource determining component 810 for determining resources for communicating over one or more channels in ULL wireless communications. In an aspect, for example, channel resource determining component 810 may include hardware (e.g., one or more processor modules of the one or more processors 803) and/or computer-readable code or instructions stored in memory 805 and executable by at least one of the one or more processors 803 to perform the specially configured channel resource determining operations described herein. Further, for instance, the one or more processors 803 and/or memory 805 may execute actions or operations defined by an optional DM-RS resource determining component 812 for determining resources over which to communicate DM-RS. In an aspect, for example, DM-RS resource determining component 812 may include hardware (e.g., one or more processor modules of the one or more processors 803) and/or computer-readable code or instructions stored in memory 805 and executable by at least one of the one or more processors 803 to perform the specially configured DM-RS resource determining operations described herein. Further, for instance, the one or more processors 803 and/or memory 805 may optionally execute actions or operations defined by an optional channel state information (CSI) feedback component 814 for generating and/or communicating CSI feedback based on a received CSI reference signal (CSI-RS). In an aspect, for example, CSI feedback component 814 may include hardware (e.g., one or more processor modules of the one or more processors 803) and/or computer-readable code or instructions stored in memory 805 and executable by at least one of the one or more processors 803 to perform the specially configured CSI feedback operations described herein.

Similarly, in an aspect, eNB 804 may include one or more processors 853 and/or a memory 855 that may be communicatively coupled, e.g., via one or more buses 857, and may operate in conjunction with or otherwise implement a scheduling component 302 for generating resource grants for one or more UEs for ULL wireless communications. For example, the various functions related to scheduling component 302 may be implemented or otherwise executed by one or more processors 853 and, in an aspect, can be executed by a single processor, while in other aspects, different ones of the functions may be executed by a combination of two or more different processors, as described above. In one example, the one or more processors 853 and/or memory 855 may be configured as described in examples above with respect to the one or more processors 803 and/or memory 805 of UE 802.

In an example, the one or more processors 853 and/or memory 855 may execute actions or operations defined by scheduling component 302 or its subcomponents. For instance, the one or more processors 853 and/or memory 855 may execute actions or operations defined by a resource grant generating component 820 for generating a resource grant specifying one or more parameters related to assigned resources in ULL communications. In an aspect, for example, resource grant generating component 820 may include hardware (e.g., one or more processor modules of the one or more processors 853) and/or computer-readable code or instructions stored in memory 855 and executable by at least one of the one or more processors 853 to perform the specially configured resource granting operations described herein. Further, for instance, the one or more processors 853 and/or memory 855 may execute actions or operations defined by an optional DM-RS receiving component 822 for receiving a DM-RS from one or more UEs to which the resources in ULL communications are assigned. In an aspect, for example, DM-RS receiving component 822 may include hardware (e.g., one or more processor modules of the one or more processors 853) and/or computer-readable code or instructions stored in memory 855 and executable by at least one of the one or more processors 853 to perform the specially configured DM-RS receiving operations described herein. Further, for instance, the one or more processors 853 and/or memory 855 may execute actions or operations defined by an optional CSI-RS transmitting component 824 for transmitting CSI-RSs to the one or more UEs. In an aspect, for example, CSI-RS transmitting component 824 may include hardware (e.g., one or more processor modules of the one or more processors 853) and/or computer-readable code or instructions stored in memory 855 and executable by at least one of the one or more processors 853 to perform the specially configured CSI-RS transmitting operations described herein.

In an example, transceivers 806, 856 may be configured to transmit and receive wireless signals through one or more antennas, an RF front end, one or more transmitters, and one or more receivers. In an aspect, transceivers 806, 856 may be tuned to operate at specified frequencies such that UE 802 and/or eNB 804 can communicate at a certain frequency. In an aspect, the one or more processors 803 may configure transceiver 806 and/or one or more processors 853 may configure transceiver 856 to operate at a specified frequency and power level based on a configuration, a communication protocol, etc. to communicate uplink signals 808 and/or downlink signals 809, respectively, over related uplink or downlink communication channels.

In an aspect, transceivers 806, 856 can operate in multiple bands (e.g., using a multiband-multimode modem, not shown) such to process digital data sent and received using transceivers 806, 856. In an aspect, transceivers 806, 856 can be multiband and be configured to support multiple frequency bands for a specific communications protocol. In an aspect, transceivers 806, 856 can be configured to support multiple operating networks and communications protocols. Thus, for example, transceivers 806, 856 may enable transmission and/or reception of signals based on a specified modem configuration.

Figure 9:
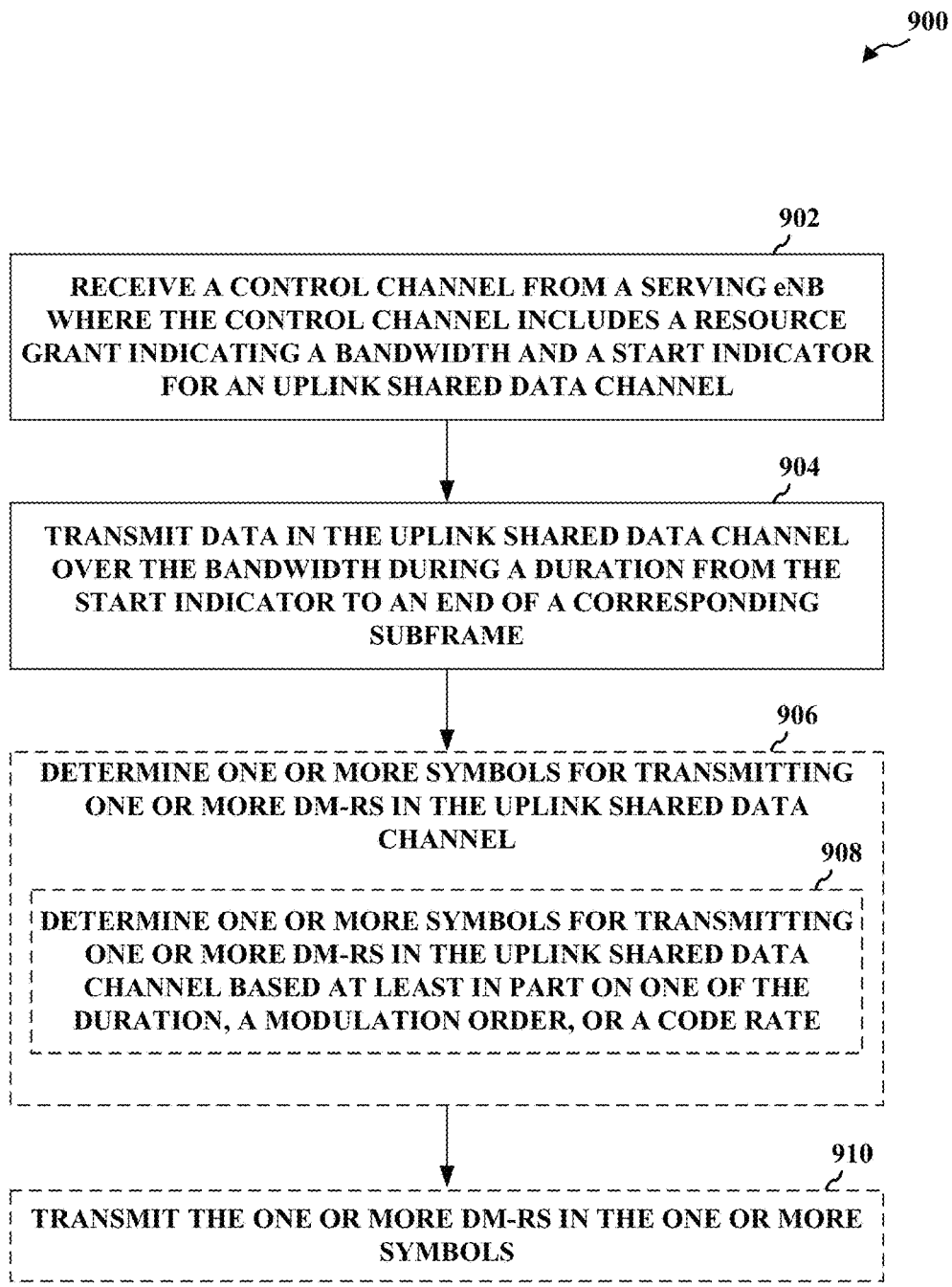
FIG. 9 is a flow chart of an example of a method for communicating over a FDM shared uplink data channel resource allocation in accordance with aspects described herein.

FIG. 9 illustrates an example of a method 900 for communicating (e.g., by a UE) over ULL communication resources assigned by an eNB. Though generally described in terms of a UE communicating with an eNB over resources assigned by the eNB, the functions described herein can be utilized by substantially any devices in wireless communication where one device schedules resources for communicating by the other device. In method 900, blocks indicated as dashed boxes represent optional steps.

At Block 902, the UE can receive a control channel from a serving eNB where the control channel includes a resource grant indicating a bandwidth and a start indicator for an uplink shared data channel. In an aspect, communicating component 361, e.g., in conjunction with processor(s) 803, memory 805, and/or transceiver 806, can receive the control channel (e.g., a uPDCCH) from the serving eNB (e.g., eNB 804) where the control channel includes a resource grant (e.g., resource grant 880) indicating a bandwidth and a start indicator for the uplink shared data channel. For example, where the eNB 804 allocates resources in FDM (e.g., according to examples shown in allocation space 500 in FIG. 5), as described, eNB 804 can indicate a bandwidth corresponding to the uplink shared data channel and a start indicator indicating a period of time (e.g., a symbol, where the indicator may include an index of the symbol with the subframe) during which the uplink shared data channel begins. For example, the indicated bandwidth may include an indication of frequency resources (e.g., a frequency band, a number of resource blocks, etc.) over which the resources are scheduled during the period of time. In an example, the uplink shared data channel is accordingly scheduled over the bandwidth beginning at the period of time indicated by the start indicator and extending to a known or configured ending period of time (e.g., an end of the subframe, a number of symbols from the starting symbol, etc.). In addition, referring to FIG. 5, communicating component 361 may receive the resource grant over the uPDCCH in the first periods of time 510 in the subframe, where the resource grant indicates the bandwidth and start indicator within the third periods of time 514 in the subframe (e.g., with periods of time 512 corresponding to the GP in between).

At Block 904, the UE can transmit data in the uplink shared data channel over the bandwidth during a duration from the start indicator to a corresponding ending period of time. In an aspect, communicating component 361, e.g., in conjunction with processor(s) 803, memory 805, and/or transceiver 806, can transmit the data in the uplink shared data channel over the bandwidth during a duration from the start indicator to a corresponding ending period of time (e.g., an end of the subframe, a number of symbols from the starting symbols, or other configured or known ending period of time, as described). In an example, channel resource determining component 810 can determine the bandwidth and the starting indicator from the resource grant received from eNB 804, and communicating component 361 can accordingly schedule data transmission over the resources (e.g., one or more resource blocks) corresponding to the bandwidth and period of time from the starting indicator to the known ending period of time (e.g., the end of the subframe). Thus, for example, the uplink shared data channel (e.g., uPUSCH) can have a configurable bandwidth and duration where the position of the channel within the resources is aligned with a start indicator.

Optionally, at Block 906, the UE can determine one or more symbols for transmitting one or more DM-RS in the uplink shared data channel. In an aspect, DM-RS resource determining component 812, e.g., in conjunction with processor(s) 803, and/or memory 805, can determine the one or more symbols for transmitting one or more DM-RS in the uplink shared data channel. For example, the eNB 804 may indicate the one or more resources in the resource grant (e.g., resource grant 880), and DM-RS resource determining component 812 may determine the one or more symbols based on the indication in the resource grant. In another example, in determining the one or more symbols at Block 906, the UE may optionally, at Block 908, determine one or more symbols for transmitting one or more DM-RS in the uplink shared data channel based at least in part on one or more parameters. In an aspect, DM-RS resource determining component 812 can implicitly determine the one or more symbols for transmitting one or more DM-RS in the uplink shared data channel based at least in part on the one or more parameters, which may include a duration (e.g., the duration corresponding to the start indicator to the end of the subframe), a modulation order, a code rate, and or other aspects corresponding to a waveform configuration of the received control channel. In addition, for example, DM-RS resource determining component 812 can determine the number of symbols over which to transmit DM-RS (e.g., 1 symbol, 2 symbols, etc.) based on the duration of the grant, modulation order, code rate etc. For example, DM-RS resource determining component 812 can determine additional DM-RS symbols where a duration of the uplink grant achieves a threshold duration, where data to be transmitted over the uplink shared data channel achieves a threshold modulation order and/or code rate, etc. Thus, in an example, the one or more symbols for transmitting DM-RS need not be explicitly conveyed by the eNB 804 in the resource grant.

In another example, at Block 910, the UE may optionally transmit the one or more DM-RS in the one or more symbols. In an aspect, communicating component 361, e.g., in conjunction with processor(s) 803, memory 805, and/or transceiver 806, can transmit the DM-RS in the one or more symbols to allow eNB 804 to demodulate data transmitted by the UE in the uplink shared data channel (e.g., within the symbols of the associated subframe).

Figure 10:
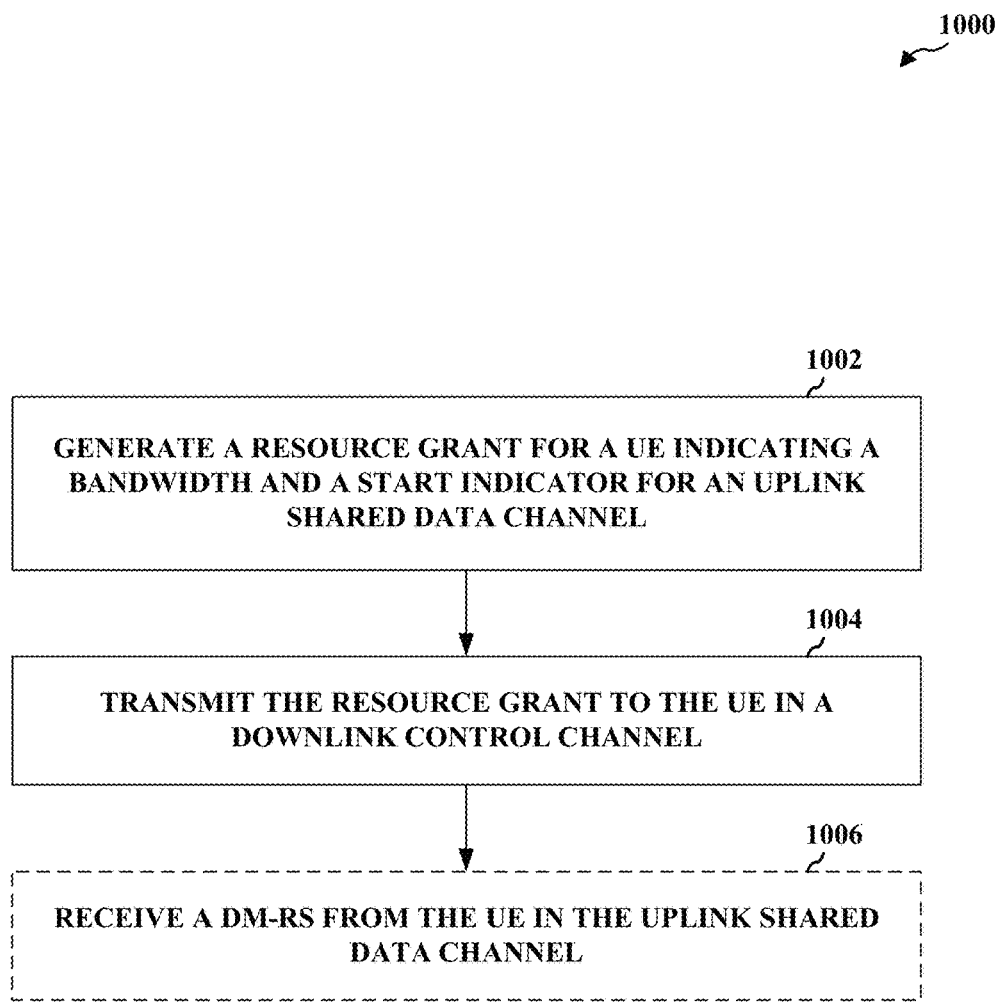
FIG. 10 is a flow chart of an example of a method for scheduling FDM shared uplink data channel resources in accordance with aspects described herein.

FIG. 10 illustrates an example of a method 1000 for scheduling (e.g., by an eNB) resources for ULL communication. Though generally described in terms of an eNB scheduling resources for a UE, the functions described herein can be utilized by substantially any devices in wireless communication where one device schedules resources for communicating by the other device. In method 1000, blocks indicated as dashed boxes represent optional steps.

At Block 1002, the eNB can generate a resource grant indicating a bandwidth and a start indicator for an uplink shared data channel. In an aspect, resource grant generating component 820, e.g., in conjunction with processor(s) 853, and/or memory 855, can generate the resource grant indicating the bandwidth and the start indicator for the uplink shared data channel. For example, where the resource grant generating component 820 allocates resources in FDM (e.g., according to examples shown in allocation space 500 in FIG. 5), as described, resource grant generating component 820 can indicate a bandwidth (e.g., a frequency band, a number of resource blocks, or other indications of bandwidth) corresponding to the uplink shared data channel and a start indicator indicating a period of time (e.g., a symbol) during which the uplink shared data channel begins. In an example, the uplink shared data channel is accordingly scheduled over the bandwidth beginning at the period of time indicated by the start indicator and extending to a known or configured ending period of time (e.g., an end of the subframe, a number of symbols from the starting symbol, etc.), as described. In one example, eNB 804 can configure the ending period of time to one or more UEs (e.g., UE 802). For example, resource grant generating component 820 may determine a size for the uplink shared data channel for a given UE (e.g., in the frequency domain as a bandwidth, in the time domain as number of symbols, etc.) based on one or more parameters of the UE, which may include an indicated buffer status report (BSR), a reported channel quality, and/or the like.

At Block 1004, the eNB can transmit the resource grant to the UE in a downlink control channel. In an aspect, communicating component 361, e.g., in conjunction with processor(s) 853, memory 855, and/or transceiver 856, can transmit the resource grant (e.g., resource grant 880) to the UE (e.g., UE 802) in a downlink control channel (e.g., uPDCCH). Accordingly, in an example, scheduling component 302 may also receive communications from UE 802 over the granted resources corresponding to the bandwidth over a duration corresponding to the start indicator and ending at a known ending period of time (e.g., the end of the subframe). Thus, for example, the uplink shared data channel (e.g., uPUSCH) can have a configurable bandwidth and duration where the position of the channel within the resources is aligned with a start indicator. In addition, referring to FIG. 5, scheduling component 302 may transmit the resource grant over the uPDCCH in the first periods of time 510 in the subframe indicating the bandwidth and start indicator within the third periods of time 514 in the subframe (e.g., with periods of time 512 corresponding to the GP in between).

Optionally, at Block 1006, the eNB may receive a DM-RS from the UE in the uplink shared data channel. In an aspect, DM-RS receiving component 822, e.g., in conjunction with processor(s) 853, memory 855, and/or transceiver 856, can receive the DM-RS from the UE (e.g., UE 802) in the uplink shared data channel. As described in one example, resource grant generating component 820 may generate the resource grant 880 to additionally indicate one or more symbols within the resources allocated for the uplink shared data channel, where the one or more symbols are to be used for DM-RS transmission. In another example, the UE 802 can autonomously determine the one or more symbols, as described. In addition, for example, eNB 804 can utilize the received DM-RS to demodulate data received from the UE 802 over the shared uplink data channel.

Figure 11:
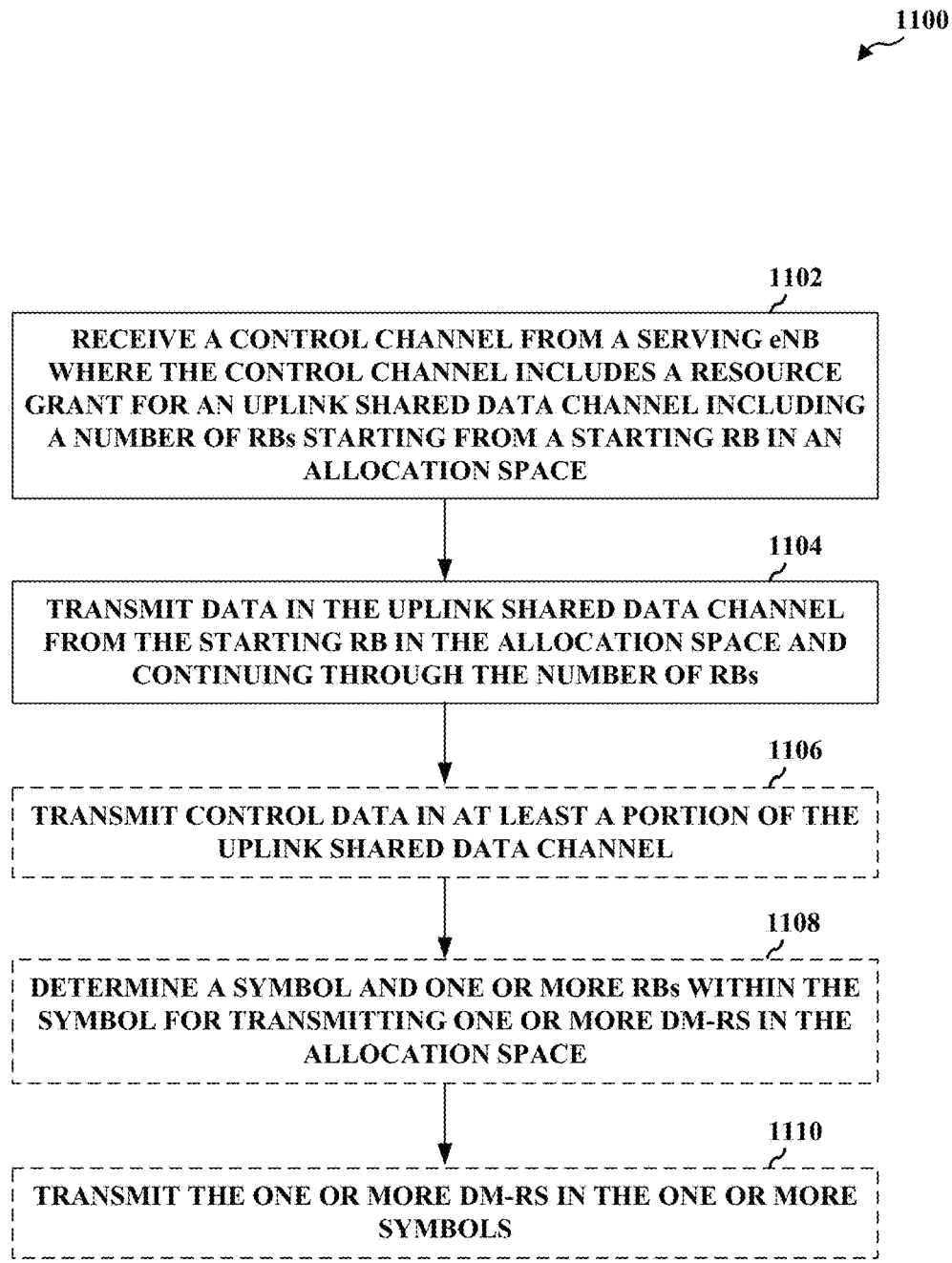
FIG. 11 is a flow chart of an example of a method for communicating over a TDM shared uplink data channel resource allocation in accordance with aspects described herein.

FIG. 11 illustrates an example of a method 1100 for communicating (e.g., by a UE) over ULL communication resources assigned by an eNB. Though generally described in terms of a UE communicating with an eNB over resources assigned by the eNB, the functions described herein can be utilized by substantially any devices in wireless communication where one device schedules resources for communicating by the other device. In method 1100, blocks indicated as dashed boxes represent optional steps.

At Block 1102, the UE can receive a control channel from a serving eNB where the control channel includes a resource grant for an uplink shared data channel including a number of RBs starting from a starting RB in an allocation space. In an aspect, communicating component 361, e.g., in conjunction with processor(s) 803, memory 805, and/or transceiver 806, can receive the control channel (e.g., a uPDCCH) from the serving eNB (e.g., eNB 804) where the control channel includes a resource grant (e.g., resource grant 880) for an uplink shared data channel including a number of RBs starting from a starting RB in an allocation space. For example, the resource grant 880 can include an indicator of the number of RBs starting from the starting RB in the allocation space. For example, where the eNB 804 allocates resources in TDM (e.g., according to examples shown in allocation space 502 in FIG. 5), as described, eNB 804 can indicate, in the resource grant 880, a number of RBs starting from a starting RB in the allocation space, where the RBs can correspond to individual RBs, groups of RBs (e.g., a 5 MHz portion of RBs as shown as RB group 519 in FIG. 5, etc.). Thus, for example, the RBs can be allocated in frequency first and in time second, such that, beginning from the starting RB, resources are allocated in subsequent RBs for the corresponding period of time (e.g., the symbol) where the starting RB is not the last RB in the period of time, then beginning at a first RB in the next period of time (e.g., the next symbol) and continuing to subsequent RBs in this next period of time, and so on until the number of RBs are reached.

In a specific example, the RBs (or groups of RBs) can be assigned an index sequentially beginning with the first RB (or RB group) at the start of a frequency band in a first period of time (e.g., symbol, where the symbol can be the TTI of the ULL communication technology), and continuing to the next RB (or RB group) in the frequency band in the first period of time, etc. until the last RB (or RB group) in the frequency band in the first period of time. Then the next sequential index can be assigned to a first RB (or RB group) at the start of the frequency band in a second period of time, and continuing to the next RB (or RB group) in the frequency band in the second period of time, etc. until the last (or ending) RB (or RB group) in the frequency band in a last period of time. Thus, the eNB 804 may communicate a start indicator of an RB (or RB group) index and a number of RBs (or RB groups) to the UE 802 in the resource grant 880, communicating component 361 can receive the resource grant 880, and channel resource determining component 810 can determine the resources corresponding to the uplink shared data channel based on the start indicator of the RB (or RB group) index and the number of RBs indicated in the resource grant 880. In an example, communicating component 361 can alternatively receive an indication of an ending RB, and accordingly determine the resources from the starting RB to the ending RB.

Referring to FIG. 5, for example, communicating component 361 may receive the resource grant over the uPDCCH in one or more RBs (or RB groups) 519 in the first periods of time 520 in the subframe (e.g., in one or more of the first three symbols), where the resource grant indicates the starting RB and number of RBs (or ending RB) for the uplink shared data channel occurring within the third periods of time 524 in the subframe (e.g., in the fifth, sixth, and the first two RB groups of the seventh symbol for user 1), with periods of time 522 corresponding to RBs (or RB groups) of the GP in between. In a specific example, the resource grant for User 1 in FIG. 5 may indicate a starting RB of 0 (or 16 if indexed from the beginning of the subframe), and a number of RBs of 10. In addition, as described further below, the eNB 804 may allocate resources to UEs based on an estimated proximity of the UEs to the eNB 804.

At Block 1104, the UE can transmit data in the uplink shared data channel from the starting RB in the allocation space and continuing through the number of RBs. In an aspect, communicating component 361, e.g., in conjunction with processor(s) 803, memory 805, and/or transceiver 806, can transmit the data in the uplink shared data channel from the starting RB in the allocation space and continuing through the number of RBs. In an example, as described, channel resource determining component 810 can determine the starting RB (or RB group) and the number of RBs (or RB groups) from the resource grant 880 received from eNB 804 (which may additionally include an ending RB), and communicating component 361 can accordingly schedule data transmission over the resources (e.g., one or more RBs or RB groups) to encompass the starting RB through the number of RBs (or ending RB). Thus, in a specific example, the uplink shared data channel (e.g., uPUSCH) can be configurable over one or more 25 RB units (e.g., corresponding to 5 MHz RB groups 519).

In an example, at Block 1106, the UE can optionally transmit control data in at least a portion of the uplink shared data channel. In an aspect, communicating component 361, e.g., in conjunction with processor(s) 803, memory 805, and/or transceiver 806, may transmit control data in at least a portion of the uplink shared data channel. For example, communicating component 361 may determine to transmit the control data in the uplink shared data channel based at least in part on the resource grant 880, which may be received over uPDCCH as described. For example, eNB 804 may trigger CQI transmission in the uplink shared data channel (e.g., uPUSCH) within the resource grant 880, and communicating component 361 can accordingly receive the resource grant 880 and transmit the CQI in the uplink shared data channel based on the trigger. Additional information can be included in the uplink shared data channel transmission to prevent simultaneous transmission of uPUSCH and uPUCCH, in one example. Thus, as shown in FIG. 6, for example, though some UEs may transmit control data in the portions of frequency 610 (which may span multiple symbols), other UEs (and/or the same UEs) may transmit control data in the portions of frequency 612 allocated for shared data channel communications.

Optionally, at Block 1108, the UE can determine a symbol for transmitting one or more DM-RS within the allocation space. In an aspect, DM-RS resource determining component 812, e.g., in conjunction with processor(s) 803, and/or memory 805, can determine the symbol for transmitting one or more DM-RS in the allocation space. For example, the eNB 804 may indicate the symbol and/or a corresponding portion of frequency (e.g., a RB or RB group, one or more RBs in the RB group, etc.) in the resource grant (e.g., resource grant 880) or a separate communication for transmitting the DM-RS. DM-RS resource determining component 812 may determine the symbol and/or portion of frequency for transmitting the DM-RS based on the indication in the resource grant. For example, referring to FIG. 5, eNB 804 may indicate period of time 526 for DM-RS transmissions, and/or may indicate a portion of frequency within period of time 526 for DM-RS transmissions generally or specific to a given UE 802. In any case, UE 802 can receive the indication (e.g., and determine DM-RS usage during demodulation) and can accordingly schedule DM-RS transmissions in the period of time 526 (and/or over the corresponding portion of frequency).

In another example, at Block 1110, the UE may optionally transmit the one or more DM-RS in the one or more symbols. In an aspect, communicating component 361, e.g., in conjunction with processor(s) 803, memory 805, and/or transceiver 806, can transmit the DM-RS in the one or more symbols (and/or over the corresponding portion of frequency) to allow eNB 804 to demodulate data transmitted by the UE in the uplink shared data channel (e.g., in the corresponding subframe).

Figure 12:
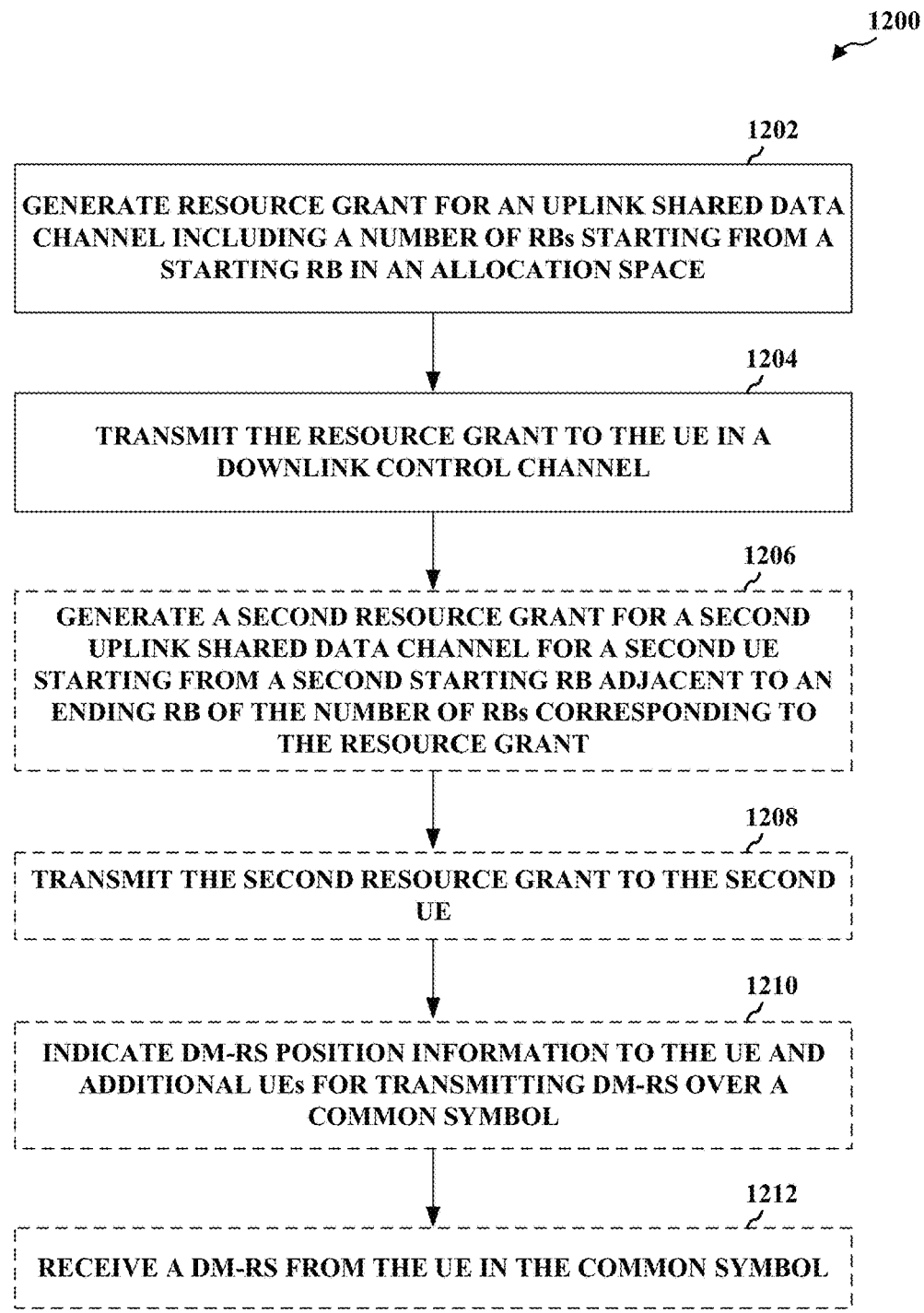
FIG. 12 is a flow chart of an example of a method for scheduling TDM shared uplink data channel resources in accordance with aspects described herein.

FIG. 12 illustrates an example of a method 1200 for scheduling (e.g., by an eNB) resources for ULL communication. Though generally described in terms of an eNB scheduling resources for a UE, the functions described herein can be utilized by substantially any devices in wireless communication where one device schedules resources for communicating by the other device. In method 1200, blocks indicated as dashed boxes represent optional steps.

At Block 1202, the eNB can generate a resource grant for an uplink shared data channel including a number of RBs starting from a starting RB in an allocation space. In an aspect, resource grant generating component 820, e.g., in conjunction with processor(s) 853, and/or memory 855, can generate the resource grant (e.g., resource grant 880) for the uplink shared data channel including the number of RBs starting from the starting RB in the allocation space. For example, where the resource grant generating component 820 allocates resources in TDM (e.g., according to examples shown in allocation space 502 in FIG. 5), as described, resource grant generating component 820 can include, in the resource grant 880, an indication of the starting RB (or RB group) and the number of RBs for a given uplink shared data channel (or an ending RB or RB group) corresponding to the third periods of time 524. In an example, the uplink shared data channel is accordingly scheduled over the RBs indicated by the starting RB (or RB group) (e.g., based on an index thereof) and continuing for an indicated number of RBs (or RB groups) and/or until an indicated ending RB (or RB group). For example, resource grant generating component 820 may determine a size (e.g., a number of RBs or RB groups) for the uplink shared data channel for a given UE based on one or more parameters of the UE, which may include an indicated buffer status report (BSR), a reported channel quality, and/or the like. For example, the eNB 804 may determine a larger sized allocation for a UE having a BSR greater than that of another UE.

At Block 1204, the eNB can transmit the resource grant to the UE in a downlink control channel. In an aspect, communicating component 361, e.g., in conjunction with processor(s) 853, memory 855, and/or transceiver 856, can transmit the resource grant (e.g., resource grant 880) to the UE (e.g., UE 802) in a downlink control channel (e.g., uPDCCH). Accordingly, in an example, scheduling component 302 may also receive communications from UE 802 over the granted resources corresponding to the starting RB (or RB group) and the number of RB (or RB groups) (or an ending RB or RB group). Thus, for example, the uplink shared data channel (e.g., uPUSCH) can have a configurable bandwidth based on the number of RBs (or RB groups) allocated to the uplink shared data channel. In addition, referring to FIG. 5, scheduling component 302 may transmit the resource grant over the uPDCCH in the RBs (or RB groups) corresponding to the first periods of time 520 in the subframe, where the resource grant indicates the starting RB (or RB group), number of RBs (or RB groups), or an ending RB (or RB group) within the third periods of time 524 in the subframe (e.g., with periods of time 522 corresponding to the GP in between). Moreover, in an example, the resource grant may include an indicator for the UE 802 to transmit control data (or a certain type of control data) in the uplink shared data channel, such as a trigger to transmit CQI in the uplink shared data channel.

Optionally, at Block 1206, the eNB may generate a second resource grant for a second uplink shared data channel for a second UE starting from a second starting RB adjacent to an ending RB of the number of RBs corresponding to the resource grant. In an aspect, resource grant generating component 820, e.g., in conjunction with processor(s) 853, and/or memory 855, can generate the second resource grant for the second uplink shared data channel for the second UE starting from the second starting RB adjacent to an ending RB of the number of RBs corresponding to the resource grant, which is the resource grant transmitted to the UE 802. For example, resource grant generating component 820 can accordingly allocate the uplink shared data channels contiguously in frequency first and time second, as described, to limit overhead in the allocation space. In addition, in an example, resource grant generating component 820 can allocate the uplink shared data channels such that nearby UEs are allocated before distant UEs. For example, resource grant generating component 820 may estimate an order of distance of the UEs based on one or more parameters related to the UEs (e.g., uplink received signal strength indicator (RSSI) measurements, received CQI, etc.), and may allocate resources for an uplink shared data channel for a nearest proximity UE first (e.g., beginning with a RB or RB group adjacent to an ending RB or RB group of the GP), followed by a next nearest proximity UE, and so on.

In any case, optionally, at Block 1208, the eNB can transmit the second resource grant to the second UE. In an aspect, communicating component 361, e.g., in conjunction with processor(s) 853, memory 855, and/or transceiver 856, can transmit the second resource grant (e.g., resource grant 880) to the second UE (e.g., other than UE 802) in the downlink control channel (e.g., uPDCCH).

Moreover, at Block 1210, the eNB may optionally indicate DM-RS position information to the UE and additional UEs for transmitting DM-RS over a common symbol. In an aspect, resource grant generating component 820 may, e.g., in conjunction with processor(s) 853, memory 855, and/or transceiver 856, indicate the DM-RS position information to the UE (e.g., UE 802) and additional UEs for transmitting DM-RS over a common symbol (e.g., period of time 526 in FIG. 5). For example, resource grant generating component 820 may indicate the common symbol and/or a corresponding portion of frequency for transmitting the DM-RS (e.g., an RB or RB group in the symbol) to the UE(s) in a resource grant or separate communication. For example, referring to FIG. 5, the common symbol may include the period of time 526, and the resource grant 880 may include an index of the symbol within the subframe or other indicator. Moreover, as described, the common symbol may be within the allocation space for the uplink shared data channel.

Optionally, at Block 1212, the eNB may receive a DM-RS from the UE in the common symbol. In an aspect, DM-RS receiving component 822, e.g., in conjunction with processor(s) 853, memory 855, and/or transceiver 856, can receive the DM-RS from the UE (e.g., UE 802) in the common symbol. As described, for example, eNB 804 can utilize the DM-RS to demodulate data received from the UE 802 over the shared uplink data channel.

Figure 13:
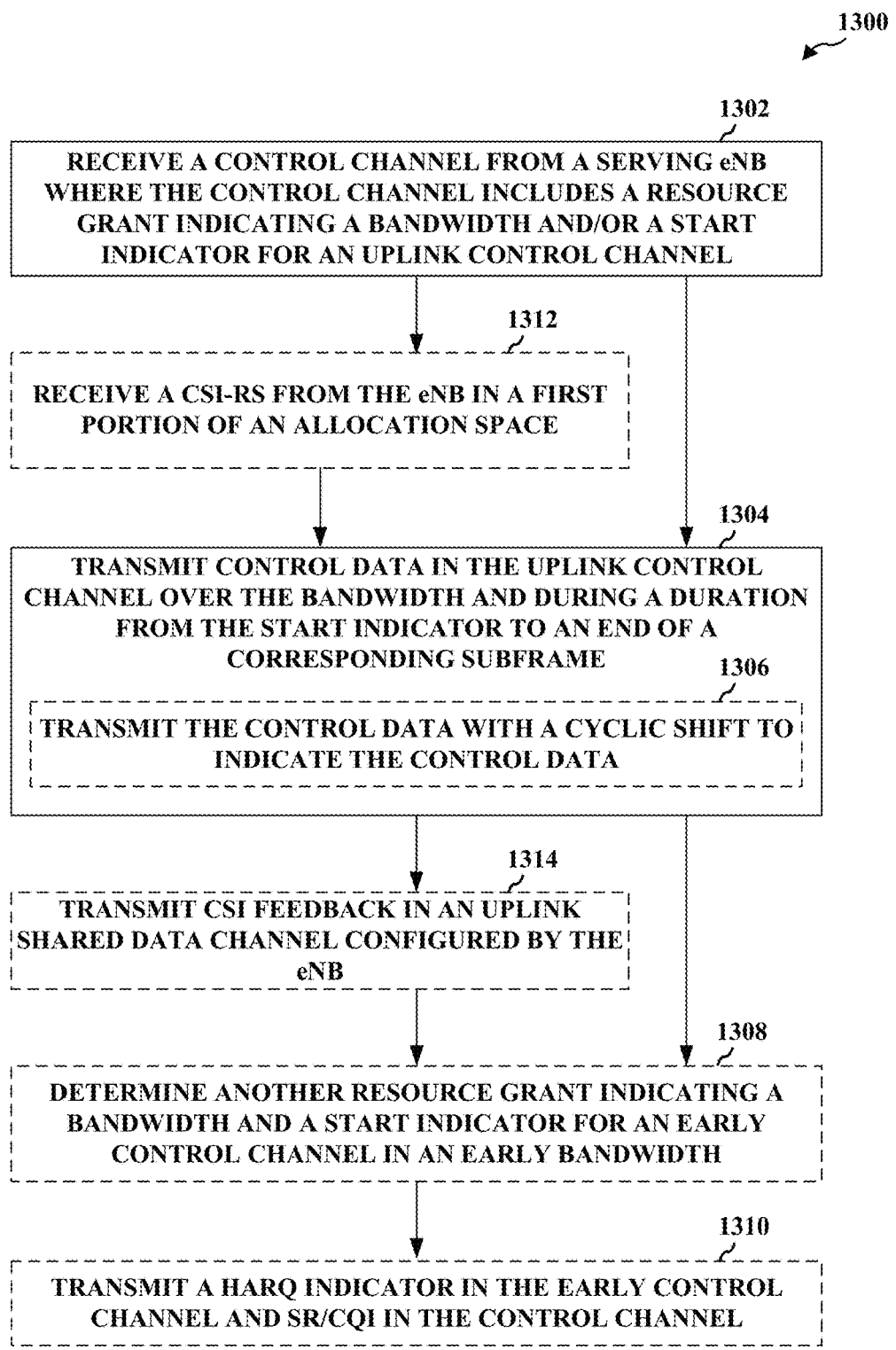
FIG. 13 is a flow chart of an example of a method for communicating over an uplink control channel resource allocation in accordance with aspects described herein.

FIG. 13 illustrates an example of a method 1300 for communicating (e.g., by a UE) over ULL communication resources assigned by an eNB. Though generally described in terms of a UE communicating with an eNB over resources assigned by the eNB, the functions described herein can be utilized by substantially any devices in wireless communication where one device schedules resources for communicating by the other device. In method 1300, blocks indicated as dashed boxes represent optional steps.

At Block 1302, the UE can receive a control channel from a serving eNB where the control channel includes a resource grant indicating a bandwidth and/or a start indicator for an uplink control channel. In an aspect, communicating component 361, e.g., in conjunction with processor(s) 803, memory 805, and/or transceiver 806, can receive the control channel (e.g., a uPDCCH) from the serving eNB (e.g., eNB 804) where the control channel includes a resource grant (e.g., resource grant 880) indicating the bandwidth and/or the start indicator for the uplink control channel. For example, where the eNB 804 allocates resources in TDM (e.g., according to examples shown in allocation space 600, 602 in FIG. 6, 700 in FIG. 7, etc.), as described, eNB 804 can indicate the bandwidth and/or the start indicator for the control channel in the resource grant 880. For example, the start indicator may be an index of a RB or RB group, an index of a symbol (e.g., where the symbol can be the TTI of the ULL communication technology), etc. where the uplink control channel begins. In addition, in an example, the resource grant 880 may indicate the bandwidth and/or the bandwidth may be otherwise known by the UE 802 or separately configured. In one example, UE 802 can perform methods 900 and/or 1100 along with method 1300 such that the control channel received at Block 1302 may be a second control channel received over other resources, additional information received in the same control channel as received at Block 902 or 1102, etc.

In an example, the bandwidth (e.g., as indicated in the resource grant 880) may include a portion of frequency in a first and last RB (or RB group) over symbols indicated by the start indicator and ending at a known or configured ending period of time (e.g., the last symbol in the subframe, after a number of symbols or RBs, etc.) or an otherwise configured ending symbol, examples of which are shown as portions of frequency 610 in FIG. 6, 720 in FIG. 7, etc. In another example, the bandwidth may include a portion of one or more RBs (or RB groups) in one or more common symbols for transmitting control data of multiple UEs (e.g., in the last symbol as shown as portion of frequency 620 in FIG. 6. Accordingly, for example, the resource grant 880 may indicate the portion of the one or more RBs (or RB groups) in the common symbol for a given UE to transmit control data, and/or may indicate the common symbol(s), an RB index, spacing (e.g., tone spacing) between RBs, etc. assigned to the UE.

At Block 1304, the UE can transmit control data in the uplink control channel over the bandwidth and during a duration from the start indicator to a corresponding ending period of time. In an aspect, communicating component 361, e.g., in conjunction with processor(s) 803, memory 805, and/or transceiver 806, can transmit the control data in the uplink control channel over the bandwidth (e.g., as indicated in the resource grant 880) and during a duration from the start indicator to a corresponding ending period of time (e.g., an end of the subframe, a number of symbols from the starting symbols, a number of RBs in TDM, or other configured or known ending period of time, as described). In an example, as described, channel resource determining component 810 can determine the bandwidth and a period of time (e.g., a symbol) corresponding to the start indicator from the resource grant received from eNB 804, and communicating component 361 can accordingly schedule data transmission over the resources. In an example, where the bandwidth is shared in a common symbol for multiple UEs to transmit control data (e.g., as shown in portions of frequency 620 in FIG. 6), communicating component 361 (and other communicating components of other UEs) may utilize an IFDMA waveform to transmit the control data in the multiple portions of frequency over the bandwidth. In addition, in this regard, a corresponding shared DM-RS can also be transmitted in another symbol in the subframe (e.g., a preceding symbol).

In an example, resources for the uplink control channel can be delayed from the uplink shared data channel, allocated in resource grants transmitted over the uplink control channel, to mitigate interference, and to comply with the n+k rule for HARQ feedback (e.g., to ensure feedback for the downlink channels at the beginning of the subframe is transmitted at least a threshold number of symbols (k) from the corresponding downlink communication). In addition, in an example, eNB 804 may indicate a duration of the control channel in the resource grant, and channel resource determining component 810 can determine the period of time for transmitting the control data based on the duration (e.g., instead of the end of the subframe). The duration may indicate a number of RBs (or RB groups), a number of symbols, etc. for the uplink control channel.

In an example communicating component 361 can transmit the control data as ACK/NACK, SR, CQI, etc. depending on a type of the uplink control channel. For example, an allocation space may be heavy downlink allocation as compared to uplink allocation (e.g., allocation spaces 600, 602 having 9 downlink symbols and 4 uplink symbols) or heavy uplink allocation as compared to downlink allocation (e.g., allocation space 700 having 2 downlink symbols and 10 uplink symbols). In one example, where the allocation space is heavy downlink allocation, transmitting the control data may include using different cyclic shifts to indicate the data, which may be based on whether downlink shared data channel and/or uplink shared data channels are assigned to the UE 802.

Thus, in an example, in transmitting control data at Block 1304, the UE may optionally, at Block 1306, transmit the control data with a cyclic shift to indicate the control data. In an aspect, communicating component 361 can transmit the control data with the cyclic shift to indicate the control data. Configuration of cyclic shifts, for example, can be based on downlink control channel assignment. For example, where communicating component 361 receives a downlink shared data channel assignment and an uplink shared data channel assignment from the eNB 804 (e.g., in the subframe), communicating component 361 can transmit the control data with a first cyclic shift to indicate ACK/NACK for the downlink data and/or a second cyclic shift to indicate a SR. In another example, where communicating component 361 receives an uplink shared data channel assignment from the eNB 804 (e.g., in the subframe), communicating component 361 can transmit the control data with a first cyclic shift to indicate SR and/or a second cyclic shift to indicate a request to transmit CQI to the eNB 804. Moreover, for example, where communicating component 361 receives a downlink shared data channel assignment from the eNB 804 (e.g., in the subframe), communicating component 361 can transmit the control data with a first cyclic shift to indicate a pilot (e.g., based on DM-RS) and/or a second cyclic shift to indicate ACK/NACK for the downlink data in the downlink shared data channel. Additionally, where communicating component 361 receives neither a downlink shared data channel assignment nor an uplink shared data channel assignment from the eNB 804 (e.g., in the subframe), communicating component 361 can transmit the control data with a first cyclic shift to indicate a pilot (e.g., based on DM-RS) and/or a second cyclic shift to indicate a SR. In an example, where the communicating component 361 receives an uplink shared data channel assignment, the communicating component 361 can use the DM-RS (as described above) as the pilot for corresponding transmissions over the resources of the uplink shared data channel assignment, and may not use one of the cyclic shifts for transmitting the pilot.

In another example, where the allocation space is heavy uplink allocation, the UE may optionally, at Block 1308, determine another resource grant indicating a bandwidth and a start indicator for an early control channel in an early bandwidth. In an aspect, channel resource determining component 810, e.g., in conjunction with processor(s) 803, memory 805, and/or transceiver 806, may determine another resource grant indicating the bandwidth (e.g., a frequency band, number of RBs, etc.) and start indicator (e.g., an index of a starting symbol, RB, etc.) for the early control channel in the early bandwidth. For example, resource grant 880 may include an indication of the bandwidth and start indicator for the early control channel as well, which may correspond to a portion of frequency 710 in one or more symbols in the uplink shared data channel allocation space that are separate from the portion of frequency 720 of the uplink control channel that may be near the end of the subframe. In an example, communicating component 361 can transmit some control data in the early control channel and/or additional control data in the control channel.

In an example, the UE may optionally, at Block 1310, transmit a HARQ indicator in the early control channel and SR/CQI in the control channel. In an aspect, communicating component 361, e.g., in conjunction with processor(s) 803, memory 805, and/or transceiver 806, may transmit the HARQ indicator in the early control channel and the SR/CQI in the control channel. Thus, for example, the HARQ indicator can be communicated to the eNB 804 earlier to allow possible retransmission in the next subframe, as opposed to where the HARQ indicator may be transmitted in a later uplink control channel near the end of the subframe. Referring to FIG. 7, in this example, communicating component 361 can transmit the HARQ indicator in the early control channel in portions of frequency 710 and can transmit the SR/CQI in portions of frequency 720 in a later control channel occurring later in time than the early control channel.

Moreover, for example, the UE may optionally, at Block 1312 receive a CSI-RS from the eNB in a first portion of an allocation space. In an aspect, communicating component 361, e.g., in conjunction with processor(s) 803, memory 805, and/or transceiver 806, may receive the CSI-RS (which may include CSI-interference management (CSI-IM)) from the eNB in the first portion of the allocation space (e.g., a first symbol of the subframe). For example, downlink and uplink resource grants may trigger CSI feedback from the UE 802. In an aspect, the UE 802 may also receive CSI-RS location information for detecting the CSI-RS. In any case, UE 802 may be configured to provide CSI feedback for the CSI-RS. In an example, CSI feedback component 814 can transmit the CSI feedback with the control data in the uplink control channel. In another example, the UE may optionally, at Block 1314, transmit CSI feedback in an uplink shared data channel configured by the eNB. In an aspect, CSI feedback component 814 can transmit the CSI feedback in an uplink shared data channel configured by the eNB 804 (e.g., where the eNB 804 can configure the uplink shared data channel as described above). In an example, CSI feedback component 814 can transmit CSI feedback in the uplink control channel or uplink shared data channel based at least in part on whether a trigger to report CSI is received from the eNB 804 in a downlink resource grant or an uplink resource grant, or whether the uplink shared data channel collides with the uplink control channel.

Figure 14:
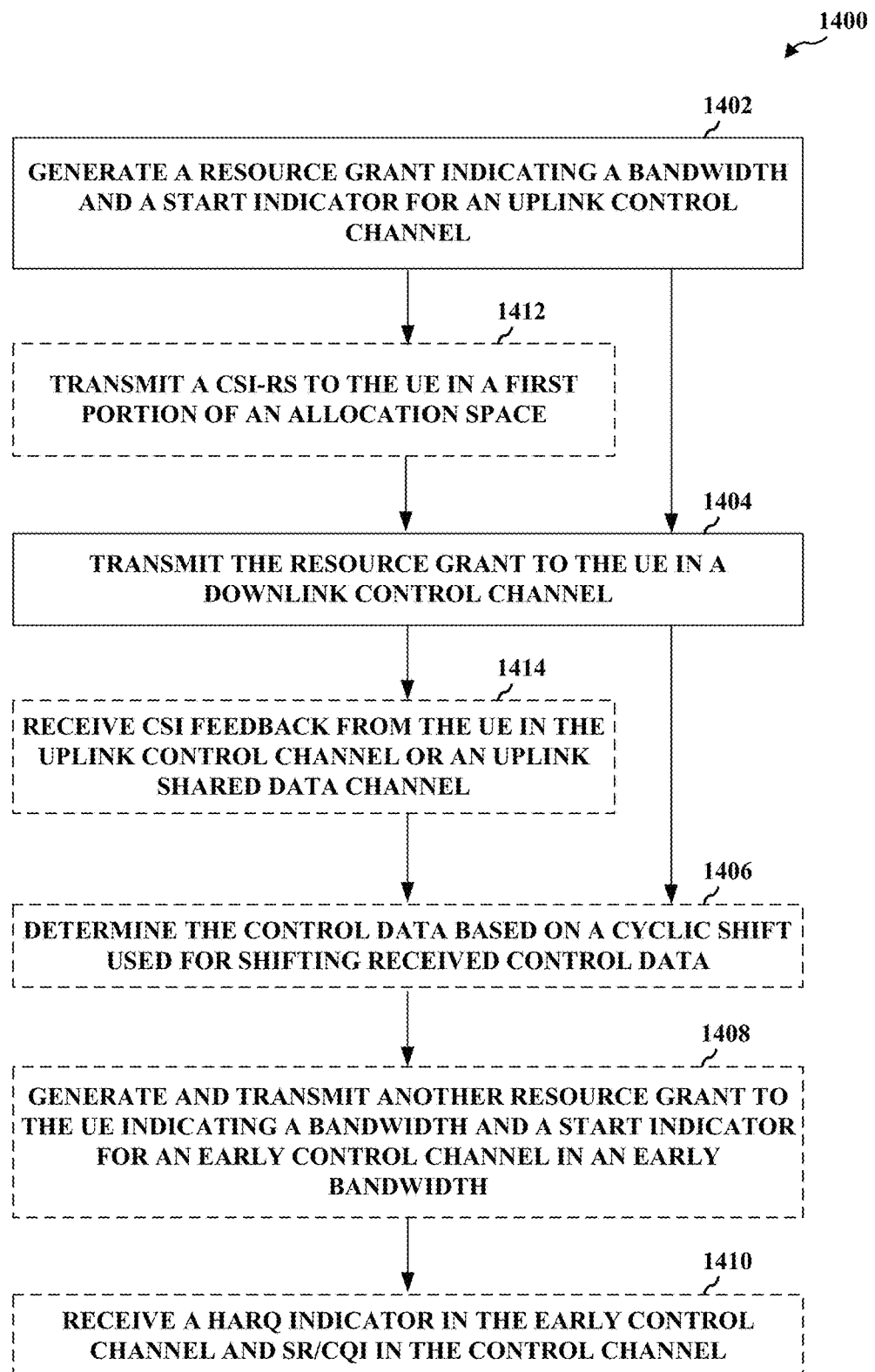
FIG. 14 is a flow chart of an example of a method for scheduling uplink control channel resources in accordance with aspects described herein.

FIG. 14 illustrates an example of a method 1400 for scheduling (e.g., by an eNB) ULL communication resources. Though generally described in terms of an eNB scheduling resources for a UE, the functions described herein can be utilized by substantially any devices in wireless communication where one device schedules resources for communicating by the other device. In method 1400, blocks indicated as dashed boxes represent optional steps.

At Block 1402, the eNB can generate a resource grant indicating a bandwidth and/or a start indicator for an uplink control channel. In an aspect, resource grant generating component 820, e.g., in conjunction with processor(s) 853, and/or memory 855, can generate the resource grant indicating the bandwidth and/or the start indicator for the uplink control channel. For example, where the eNB 804 allocates resources in TDM (e.g., according to examples shown in allocation space 600, 602 in FIG. 6, 700 in FIG. 7, etc.), as described, eNB 804 can indicate the bandwidth and/or the start indicator for the control channel in the resource grant 880. For example, the start indicator may be an index of a RB or RB group, an index of a symbol, etc. where the uplink control channel begins. In addition, in an example, the resource grant 880 may indicate the bandwidth and/or the bandwidth may be otherwise known by the eNB 804 and UE 802 or separately configured.

In an example, the bandwidth may include a portion of frequency in a first and last RB (or RB group) over symbols indicated by the start indicator and ending at a known ending period of time (e.g., the last symbol in the subframe, after a number of symbols or RBs, etc.) or an otherwise configured ending symbol, examples of which are shown as portions of frequency 610 in FIG. 6, 720 in FIG. 7, etc. In another example, the bandwidth may include a portion of one or more RBs (or RB groups) in one or more common symbols for transmitting control data of multiple UEs (e.g., in the last symbol as shown in portion of frequency 620 in FIG. 6). Accordingly, for example, the resource grant 880 may indicate the portion of the one or more RBs (or RB groups) for a given UE to transmit control data. In addition, resource grant generating component 820 may generate a minimum two symbol uPUCCH for a heavy downlink allocation space, a slot length uPUCCH for a heavy uplink allocation space, etc. Moreover, a number of RBs for the resource grant can vary based on configuration (e.g., based on an indicated duration of the uPUCCH).

At Block 1404, the eNB can transmit the resource grant to the UE in a downlink control channel. In an aspect, scheduling component 302, e.g., in conjunction with processor(s) 853, memory 855, and/or transceiver 856, can transmit the resource grant (e.g., resource grant 880) to the UE 802 in the downlink control channel (e.g., uPDCCH). Accordingly as described, UE 802 can determine the bandwidth and a period of time (e.g., a symbol) corresponding to the start indicator from the resource grant received from eNB 804, and can accordingly schedule control data transmission over the resources. Thus, in an example, the scheduling component 302 can receive control data from the UE 802 and/or other UEs over the bandwidth during the period of time.

In an example, the eNB can optionally, at Block 1406, determine the control data based on a cyclic shift used for shifting received control data. In an aspect, scheduling component 302, e.g., in conjunction with processor(s) 853, memory 855, and/or transceiver 856, can determine the control data based on the cyclic shift used for shifting received control data. For example, as described, scheduling component 302 can determine the control data based on the cyclic shift and based on whether a downlink shared data channel and/or uplink shared data channel allocation were provided to the UE 802, as described previously.

In another example, the eNB may optionally, at Block 1408, generate and transmit another resource grant to the UE indicating a bandwidth and a start indicator for an early control channel in an early bandwidth. In an aspect, resource grant generating component 820, e.g., in conjunction with processor(s) 853, memory 855, and/or transceiver 856, can generate and transmit another resource grant to the UE 802 (e.g., in the same or different downlink transmission) indicating a bandwidth and a start indicator for the early control channel in the early bandwidth. As described, resource grant generating component 820 may generate the resource grant for the early control channel in the early bandwidth in a heavy uplink allocation space (e.g., where a number of symbols for allocating uplink shared data channel resources achieves a threshold, where a number of resource blocks to allocate to served UEs are at least a threshold less than a number of resource blocks available in the allocation space, etc.).

Accordingly, as described, the eNB may optionally, at Block 1410, receive a HARQ indicator in the early control channel and SR/CQI in the control channel. In an aspect, scheduling component 302, e.g., in conjunction with processor(s) 853, memory 855, and/or transceiver 856, may receive the HARQ indicator in the early control channel and the SR/CQI in the control channel. Thus, for example, the HARQ indicator can be received earlier to allow scheduling component 302 to possibly retransmit corresponding downlink data in the next subframe (e.g., in the first periods of time 520 in FIG. 5), as opposed to where the HARQ indicator may be received in a later uplink control channel near the end of the subframe.

Moreover, for example, the eNB may optionally, at Block 1412 transmit a CSI-RS to the UE in a first portion of an allocation space. In an aspect, CSI-RS transmitting component 824, e.g., in conjunction with processor(s) 853, memory 855, and/or transceiver 856, may transmit the CSI-RS (which may include CSI-IM) to the UE 802 in the first portion of the allocation space (e.g., a first symbol of the subframe). In an example, eNB 804 can trigger CSI feedback via downlink and/or uplink resource grants transmitted to the UE 802 in portions of the allocation space. In an aspect, the eNB 804 may also transmit CSI-RS location information for detecting the CSI-RS. In any case, UE 802 may be configured to provide CSI feedback for the CSI-RS. In an example, the eNB may optionally, at Block 1414, receive CSI feedback from the UE in the uplink control channel or an uplink shared data channel. In an aspect, scheduling component 302 can receive CSI feedback from the UE 802 in the uplink control channel or the uplink shared data channel. In an example, scheduling component 302 can receive CSI feedback in the uplink control channel or uplink shared data channel based at least in part on whether resource grant generating component 820 triggers the UE 802 to report CSI in a downlink resource grant or an uplink resource grant, or whether the uplink shared data channel collides with the uplink control channel.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for communicating using a configurable bandwidth, comprising:
   receiving, at a user equipment (UE), a control channel from a serving evolved Node B (eNB), wherein the control channel includes a resource grant for an uplink shared data channel in an allocation space, wherein the allocation space includes a plurality of resource block groups in a frequency domain over a plurality of symbols in a time domain, and wherein the resource grant indicates a number of resource block groups, included in the plurality of resource block groups, in the frequency domain over a number of symbols forming a slot of a subframe in the time domain;
   transmitting, by the UE, data in the uplink shared data channel in the number of resource block groups over at least a first portion of the number of symbols;
   determining a symbol of the number of symbols for transmitting one or more demodulation reference signals (DM-RS) in the allocation space, where the symbol is used by a plurality of UEs to transmit DM-RSs, wherein determining the symbol for transmitting the one or more DM-RSs is based at least in part on an indication of a time domain location of the symbol within the uplink shared channel indicated by in the resource grant, wherein the indication is received in the control channel from the serving eNB; and
   transmitting the one or more DM-RSs in the number of resource block groups within the symbol.

2. The method of claim 1, wherein the number of resource block groups include a starting resource block group that is in a first symbol that is one or more symbols from a guard period.

3. The method of claim 1, further comprising transmitting, by the UE, control data in at least a portion of the uplink shared data channel.

4. The method of claim 3, further comprising receiving, by the UE, an indicator from the serving eNB to transmit the control data in the uplink shared data channel.

5. The method of claim 1, wherein the symbol is subsequent to a guard period and before a first symbol of the allocation space.

6. The method of claim 1, further comprising:
   receiving, at the UE and from the serving eNB an indication of a bandwidth and/or a start indicator for an uplink control channel;
   transmitting, by the UE, control data in the uplink control channel over the bandwidth and during a first duration from the start indicator to an end of the slot.

7. The method of claim 6, further comprising determining, based on the indication, the plurality of resource block groups starting from a starting resource block group in the allocation space for the uplink shared data channel, and wherein the bandwidth for the uplink control channel comprises at least a portion of resource blocks of the plurality of resource block groups in a portion of the plurality of symbols corresponding to the allocation space for the uplink shared data channel, and at least another portion of resource blocks of a last resource block group in the slot.

8. The method of claim 7, wherein a first symbol of the portion of the plurality of symbols is delayed at least a threshold number of symbols from a first symbol of the allocation space for the uplink shared data channel.

9. The method of claim 7, wherein a number of the portion of the plurality of symbols corresponds to a size of the allocation space for the uplink shared data channel.

10. The method of claim 7, wherein the portion of resource blocks corresponds to a second duration of the uplink control channel received in a configuration from the serving eNB.

11. The method of claim 7, wherein the portion of the plurality of symbols comprises a last symbol in the slot, and wherein transmitting the control data comprises transmitting the control data in a resource block of one or more resource block groups in the last symbol based on an indication received in a configuration from the serving eNB.

12. The method of claim 7, wherein the bandwidth for the uplink control channel further comprises an early bandwidth comprising at least a second portion of the plurality of resource block groups in a second portion of the plurality of symbols corresponding to the allocation space for the uplink shared data channel, and at least another second portion of the plurality of resource block groups in the second portion of the plurality of symbols.

13. The method of claim 6, wherein the resource grant indicates resources related to a downlink shared data channel and the uplink shared data channel, and wherein transmitting the control data comprises transmitting the control data using at least one of a first cyclic shift to indicate an acknowledgement/negative-acknowledgment for data received over the downlink shared data channel or a second cyclic shift to indicate a scheduling request for resources on the uplink shared data channel.

14. The method of claim 6, wherein the resource grant indicates resources related to the uplink shared data channel, and wherein transmitting the control data comprises transmitting, by the UE, the control data using at least one of a first cyclic shift to indicate a scheduling request for resources on the uplink shared data channel or a second cyclic shift to indicate a request to transmit a channel quality indicator.

15. The method of claim 6, wherein transmitting the control data comprises transmitting, by the UE, the control data using at least one of a first cyclic shift to indicate a pilot signal or a second cyclic shift to indicate scheduling request for resources on the uplink shared data channel.

16. The method of claim 6, further comprising receiving, by the UE, a channel state information (CSI) reference signal (CSI-RS) from the serving eNB in a first portion of the subframe, and transmitting the control data includes transmitting CSI feedback related to the CSI-RS in the uplink control channel in the slot, wherein the slot is a second portion of the subframe.

17. The method of claim 6, further comprising:
receiving a CSI-RS from the serving eNB in a first portion of the subframe; and
transmitting CSI feedback related to the CSI-RS in the uplink shared data channel in the slot, wherein the slot is a second portion of the subframe.

18. The method of claim 17, wherein transmitting the CSI feedback in the uplink shared data channel is based at least in part on determining that the uplink shared data channel collides with the uplink control channel.

19. An apparatus for communicating using a configurable bandwidth, comprising:
a transceiver;
a memory; and
at least one processor communicatively coupled with the transceiver and the memory, wherein the at least one processor is configured to:
receive a control channel from a serving evolved Node B (eNB), wherein the control channel includes a resource grant for an uplink shared data channel in an allocation space, wherein the allocation space includes a plurality of resource block groups in a frequency domain over a plurality of symbols in a time domain, and wherein the resource grant indicates a number of resource block groups, included in the plurality of resource block groups, in the frequency domain over a number of symbols forming a slot of a subframe in the time domain;
transmit data in the uplink shared data channel in the number of resource block groups over at least a first portion of the number of symbols;
determine a symbol of the number of symbols for transmitting one or more demodulation reference signals (DM-RS) in the allocation space, where the symbol is used by a plurality of UEs to transmit DM-RSs, wherein the at least one processor determines the symbol for transmitting the one or more DM-RSs based at least in part on an indication of a time domain location of the symbol within the uplink shared channel indicated by in the resource grant, wherein the indication is received in the control channel from the serving eNB; and
transmit the one or more DM-RSs in the number of resource block groups within the symbol.

20. The apparatus of claim 19, wherein the number of resource block groups include a starting resource block group that is in a first symbol that is one or more symbols from a guard period.

21. The apparatus of claim 19, wherein the at least one processor is further configured to transmit control data in at least a portion of the uplink shared data channel.

22. The apparatus of claim 21, wherein the at least one processor is further configured to receive an indicator from the serving eNB to transmit the control data in the uplink shared data channel.

23. An apparatus for communicating using a configurable bandwidth, comprising:
means for receiving, at a user equipment (UE), a control channel from a serving evolved Node B (eNB), wherein the control channel includes a resource grant for an uplink shared data channel in an allocation space, wherein the allocation space includes a plurality of resource block groups in a frequency domain over a plurality of symbols in a time domain, and wherein the resource grant indicates a number of resource block groups, included in the plurality of resource block groups, in the frequency domain over a number of symbols forming a slot of a subframe in the time domain;
means for transmitting, by the UE, data in the uplink shared data channel in the number of resource block groups over at least a first portion of the number of symbols;
means for determining a symbol of the number of symbols for transmitting one or more demodulation reference signals (DM-RS) in the allocation space, where the symbol is used by a plurality of UEs to transmit DM-RSs, wherein the means for determining determines the symbol for transmitting the one or more DM-RSs based at least in part on an indication of a time domain location of the symbol within the uplink shared channel indicated by in the resource grant, wherein the indication is received in the control channel from the serving eNB; and means for transmitting the one or more DM-RSs in the number of resource block groups within the symbol.

24. The apparatus of claim 23, wherein the number of resource block groups include a starting resource block group that is in a first symbol that is one or more symbols from a guard period.

25. A non-transitory computer-readable medium storing computer executable code for communicating using a configurable bandwidth, the code comprising:
code for receiving, at a user equipment (UE), a control channel from a serving evolved Node B (eNB), wherein the control channel includes a resource grant for an uplink shared data channel in an allocation space, wherein the allocation space includes a plurality of resource block groups in a frequency domain over a plurality of symbols in a time domain, and wherein the resource grant indicates a number of resource block groups, included in the plurality of resource block groups, in the frequency domain over a number of symbols forming a slot of a subframe in the time domain;
code for transmitting, by the UE, data in the uplink shared data channel in the number of resource block groups over at least a first portion of the number of symbols;
code for determining a symbol of the number of symbols for transmitting one or more demodulation reference signals (DM-RS) in the allocation space, where the symbol is used by a plurality of UEs to transmit DM-RSs, wherein the code for determining determines the symbol for transmitting the one or more DM-RSs based at least in part on an indication of a time domain location of the symbol within the uplink shared channel indicated by in the resource grant, wherein the indication is received in the control channel from the serving eNB; and
code for transmitting the one or more DM-RSs in the number of resource block groups within the symbol.

26. The non-transitory computer-readable medium of claim 25, wherein the number of resource block groups include a starting resource block group that is in a first symbol that is one or more symbols from a guard period.

27. The apparatus of claim 19, wherein the symbol is subsequent to a guard period and before a first symbol of the allocation space.

28. The apparatus of claim 19, wherein the at least one processor is further configured to:
receive, from the serving eNB an indication of a bandwidth and/or a start indicator for an uplink control channel;
transmit control data in the uplink control channel over the bandwidth and during a first duration from the start indicator to an end of the slot.

29. The apparatus of claim 28, wherein the at least one processor is further configured to determine, based on the indication, the plurality of resource block groups starting from a starting resource block group in the allocation space for the uplink shared data channel, and wherein the bandwidth for the uplink control channel comprises at least a portion of resource blocks of the plurality of resource block groups in a portion of the plurality of symbols corresponding to the allocation space for the uplink shared data channel, and at least another portion of resource blocks of a last resource block group in the slot.

30. The apparatus of claim 29, wherein a first symbol of the portion of the plurality of symbols is delayed at least a threshold number of symbols from a first symbol of the allocation space for the uplink shared data channel.

* * * * *